United States Patent
Shinohara et al.

(10) Patent No.: US 10,798,225 B2
(45) Date of Patent: Oct. 6, 2020

(54) SIMULTANEOUS TRANSMISSION METHOD ACROSS MULTIPLE WIRELESS COMMUNICATION STANDARDS

(71) Applicant: NIPPON TELEGRAPH AND TELEPHONE CORPORATION, Tokyo (JP)

(72) Inventors: Shoko Shinohara, Yokosuka (JP); Yasuhiko Inoue, Yokosuka (JP); Junichi Iwatani, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 73 days.

(21) Appl. No.: 16/072,583

(22) PCT Filed: Jan. 25, 2017

(86) PCT No.: PCT/JP2017/002547
§ 371 (c)(1),
(2) Date: Jul. 25, 2018

(87) PCT Pub. No.: WO2017/131033
PCT Pub. Date: Aug. 3, 2017

(65) Prior Publication Data
US 2019/0045035 A1    Feb. 7, 2019

(30) Foreign Application Priority Data

Jan. 29, 2016 (JP) .................................. 2016-015834

(51) Int. Cl.
*H04W 72/04* (2009.01)
*H04L 29/06* (2006.01)
(Continued)

(52) U.S. Cl.
CPC ................. *H04L 69/18* (2013.01); *H04J 1/08* (2013.01); *H04W 4/00* (2013.01); *H04W 74/08* (2013.01);
(Continued)

(58) Field of Classification Search
CPC ........ H04L 69/18; H04W 4/00; H04W 74/08; H04W 74/0841; H04W 74/0833;
(Continued)

(56) References Cited

U.S. PATENT DOCUMENTS 8,964,634 B2   2/2015 Jing et al.
9,154,935 B2   10/2015 Jing et al.
(Continued)

FOREIGN PATENT DOCUMENTS

JP   2012-517737 A   8/2012
KR   1020140017703 A   2/2014
(Continued)

OTHER PUBLICATIONS

Extended European Search Report regarding EPSN 177442639, dated Aug. 22, 2019.
(Continued)

*Primary Examiner* — Hassan Kizou
*Assistant Examiner* — Mahbubul Bar Chowdhury
(74) *Attorney, Agent, or Firm* — Harness, Dickey & Pierce, P.L.C.

(57) ABSTRACT

There is provided a wireless station including a plurality of standard controls corresponding respectively to a plurality of wireless communication standards sharing a frequency resource, the wireless station including a simultaneous transmissions management part setting a parameter for a random access process corresponding to each of the plurality of wireless communication standards for each of the plurality of standard controls, controlling frequencies and transmis-
(Continued)

A second example of the random access processes on the standards A and B sion start timings of the plurality of wireless communication standards, and simultaneously transmitting wireless frames of each of the wireless communication standards which obtained the transmission opportunities using FDMA, the plurality of standard controls are configured to simultaneously transmit the wireless frames of the plurality of wireless communication standards using FDMA, with the frequency resource which obtained the transmission opportunities by performing the random access process corresponding to each of the wireless communication standards under the control of the simultaneous transmissions management part.

10 Claims, 15 Drawing Sheets

(51) Int. Cl.
　　　*H04W 88/06* (2009.01)
　　　*H04W 4/00* (2018.01)
　　　*H04W 74/08* (2009.01)
　　　*H04J 1/08* (2006.01)
　　　*H04W 88/10* (2009.01)

(52) U.S. Cl.
　　　CPC ....... *H04W 74/0841* (2013.01); *H04W 88/06* (2013.01); *H04W 88/10* (2013.01); *Y02D 70/00* (2018.01)

(58) Field of Classification Search
　　　CPC ......... H04W 88/10; H04W 88/06; H04J 1/08; Y02D 70/00; H04B 7/2621
　　　See application file for complete search history.

(56) References Cited

U.S. PATENT DOCUMENTS

| | | | | |
|---|---|---|---|---|
| 9,924,512 | B1* | 3/2018 | Zhang | H04L 5/0064 |
| 2010/0202345 | A1 | 8/2010 | Jing et al. | |
| 2013/0114516 | A1* | 5/2013 | Koo | H04B 15/00 370/329 |
| 2013/0195071 | A1 | 8/2013 | Ohta | |
| 2015/0023212 | A1 | 1/2015 | Jing et al. | |
| 2015/0341933 | A1* | 11/2015 | Aboul-Magd | H04L 5/0007 370/329 |
| 2016/0234834 | A1* | 8/2016 | Aboul-Magd | H04W 74/0816 |
| 2016/0330753 | A1* | 11/2016 | Jauh | H04W 28/065 |
| 2016/0374112 | A1* | 12/2016 | Asterjadhi | H04W 74/0816 |
| 2016/0381688 | A1* | 12/2016 | Hedayat | H04L 27/26 370/329 |
| 2018/0084605 | A1* | 3/2018 | Li | H04W 84/12 |
| 2018/0270038 | A1* | 9/2018 | Oteri | H04L 5/0073 |
| 2018/0295627 | A1* | 10/2018 | Li | H04L 1/1621 |
| 2018/0368178 | A1* | 12/2018 | Dong | H04W 74/006 |

FOREIGN PATENT DOCUMENTS

| | | |
|---|---|---|
| KR | 1020160010586 A | 1/2016 |
| WO | WO-2010/091210 A2 | 8/2010 |
| WO | WO-2014189908 A2 | 11/2014 |

OTHER PUBLICATIONS

Korean Office Action regarding KRSN 1020187021719, dated Aug. 7, 2019.
Japanese Office Action regarding JPSN 2017564309, dated Jun. 11, 2019.
Robert Stacey, "Specification Framework for Tgax"; Doc.: IEEE P802.11-15/0132r8, Sep. 22, 2015.
"Part 11: Wireless LAN Medium Access Control (MAC) and Physical Layer (PHY) Specifications"; IEEE Std 802.11 TM-2012, Revision, Mar. 29, 2012.
"Study on licensed-assisted access to unlicensed spectrum", 3GPP TR 36.889 V13.0.0 (Jun. 2015).
"Introduction of LAA (eNB Channel Access Procedures)." 3GPP R1-157922, Dec. 4, 2015.
Shoko Shinohara, et al, "A Novel Multi-User Transmission Technique for Next Generation Wireless LAN Systems", IEICE Technical Report, RCS2012-192 (Dec. 2012) with partial English Translation.
International Search Report for PCT/JP2017/002547, ISA/JP, Tokyo, dated Apr. 18, 2017, with English translation thereof.
International Preliminary Report on Patentability (Ch. I) with English translation thereof, IB/Geneva, dated Jul. 31, 2018, incorporating the English translation of the Written Opinion of the ISA, ISA/JP, dated Apr. 18, 2017.

\* cited by examiner

F I G. 6
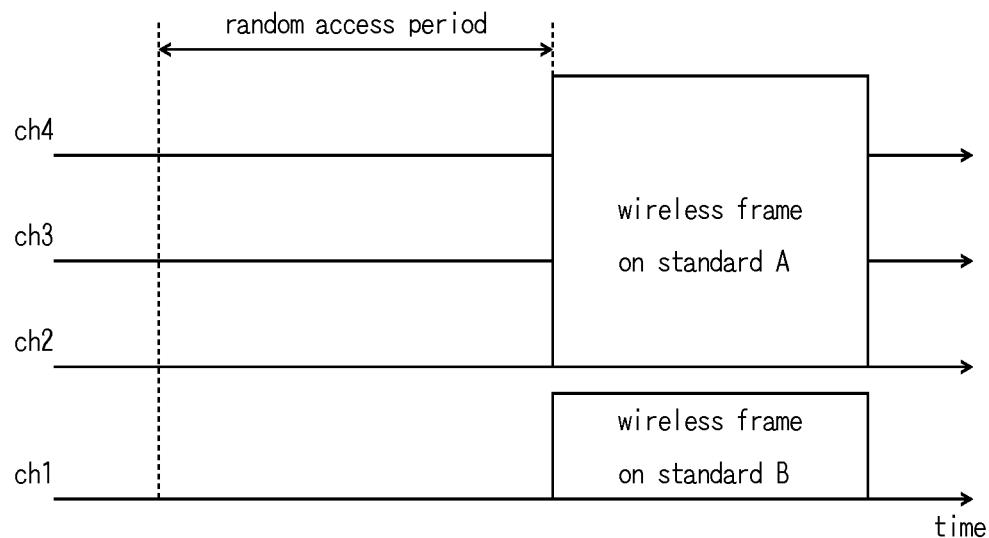
F I G. 7
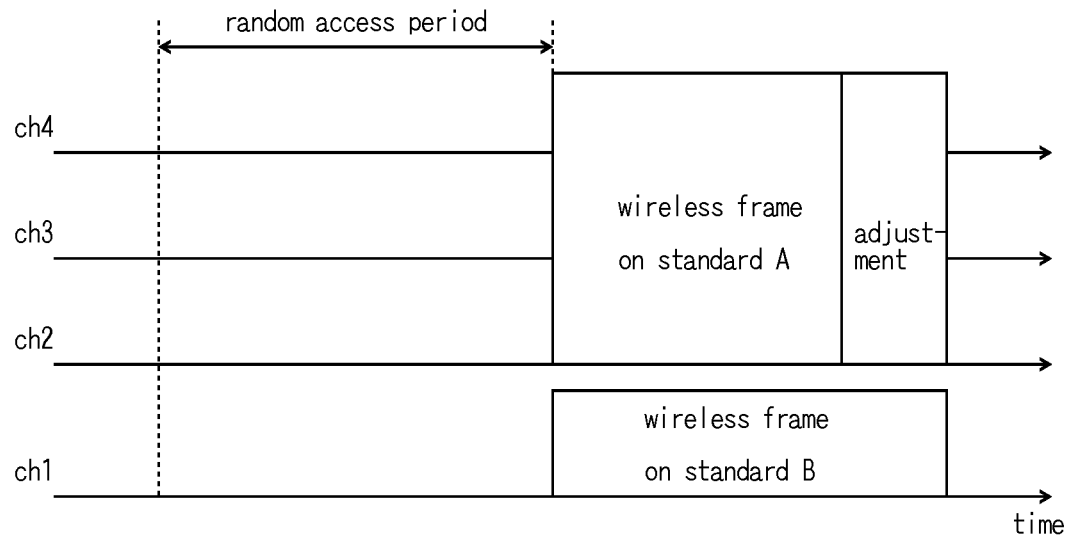

A second example of the random access processes on the standards A and B

SIMULTANEOUS TRANSMISSION METHOD ACROSS MULTIPLE WIRELESS COMMUNICATION STANDARDS

CROSS-REFERENCE TO RELATED APPLICATION

This application is a 371 U.S. National Stage application claiming the benefit of prior filed International Application No. PCT/JP2017/002547, filed on Jan. 25, 2017, in which the International Application claims priority from Japanese Patent Application Number 2016-015834, filed on Jan. 29, 2016, the entire contents of which are incorporated herein by reference.

TECHNICAL FIELD

The present invention relates to a wireless communication system in which a wireless station supports a plurality of wireless communication standards and performs wireless communication using a frequency resource effectively. Furthermore, the present invention relates to a wireless station and a wireless communication method in the wireless communication system. The term frequency resource may be replaced with a frequency segment meaning a frequency block. The result of the replacement may be the same as before.

BACKGROUND ART

In recent years, with the spread of wireless devices, the number of wireless stations for a wireless Local Area Network (LAN), Long Term Evolution (LTE), or the like has remarkably increased. It is expected that the number of wireless stations or an amount of traffic will continue to increase. Individual access processes that use individual frequency bands are stipulated in wireless communication standards which have to deal with an increasing number of wireless stations and an increasing amount of traffic and which are dedicated for high-speed wireless communication so far, such as a wireless LAN and LTE.

When it comes to the wireless LAN, IEEE 802.11 standards are in wide use. There are wireless LANs based on IEEE 802.11b/g/n standards for a 2.4 GHz band that is an unlicensed band which does not require a license and based on IEEE 802.11a/n/ac standards for 5 GHz band that is also an unlicensed band.

Furthermore, in LTE that uses a licensed band, License-assisted Access (LAA) or MuLTEfire that utilizes the unlicensed band which is used for the wireless LAN or the like has been studied in order to achieve an ever-increasing high speed. LAA is a method of performing communication using the licensed band and the unlicensed band. In LAA, there is contention for use of frequency resources in the unlicensed band among many wireless stations. The wireless station that utilizes LAA possibly perform communication in the unlicensed band as well as in the licensed band, the number of whose users is limited, and the number of available frequency resources can be increased. Moreover, if the number of available frequency resources is increased, it is expected that the high speed can be realized.

However, in the unlicensed band, there is contention between the wireless LAN, Zigbee (a registered trademark), Bluetooth (a registered trademark), or the like in the related art, and new LAA or MuLTEfire. Moreover, in the unlicensed band, the number of wireless communication standards that use the same frequency band, as well as the number of wireless stations that use the same frequency band, increases. Because of this, a plurality of wireless communication systems that comply with different wireless communication standards contents are required to use the limited frequency resources efficiently while contention for the same frequency band takes place among the wireless communication systems.

At this point, when in the wireless LAN, the contention for the same frequency resources takes place among a plurality of wireless stations, random access control is performed that is based on Carrier Sense Multiple Access with Collision Avoidance (CSMA/CA). The random access control is control that causes transmission to start after, as a result of the carrier sensing, it is determined that a channel is available for transmission and for example, a prescribed deferral time elapses. On the other hand, when it is determined that a channel is not in a state of being available for transmission, a deferral state is maintained without starting transmission until a state where the channel is available for transmission is reached. That is, in the random access control described above, a frame is transmitted in a time-based sharing manner for every wireless station.

Incidentally, in order to improve the efficiency in communication among many wireless stations, a method has been studied in which Frequency Division Multiple Access (FDMA) is used based on IEEE 802.11 that is a standard for the wireless LAN and in which a plurality of wireless LAN frames are transmitted at the same time. By using FDMA, one frequency band can be divided and the resulting small frequency bands can be used at the same time. If it is determined in a wireless access point that a channel is available for downlink communication, different channels can be allocated to a plurality of wireless stations, and transmissions can be collectively started. In uplink communication, the wireless access point transmits a wireless LAN frame that controls timings for a plurality of wireless stations, and then the plurality of wireless stations can start to transmit wireless LAN frames at the same time using different frequent resources and the wireless access point can receive the wireless LAN frames at one time from the plurality of wireless stations. For this reason, when compared with a method of accessing wireless stations one by one with CSMA/CA, communication with many wireless stations is possible and it is expected that spectrum efficiency is more improved.

Non-Patent Document 1: "Specification Framework for TGax", Robert Stacey et al., doc., IEEE 802.11-15/0132r9, 22 Sep. 2015

Non-Patent Document 2: The LAN/MAN Standards Committee, "IEEE Std 802.11TM 2012 IEEE standard for Information Technology—Telecommunications and information exchange between systems—Local and metropolitan area networks Specific requirements Part11, Wireless LAN Medium access control (MAC) and Physical Layer (PHY) Specifications"

Non-Patent Document 3: 3GPP TR 36.889 v13.0.0, "Study on licensed-assisted access to unlicensed spectrum", 2015

Non-Patent Document 4: "Introduction of LAA (eNB Channel Access Procedure)", 3GPP R1-157922, December 2015

DISCLOSURE

Problems to be Solved

As described above, in a random access process by the wireless LAN system, frame transmission is performed in a time-based sharing manner. For this reason, the greater the numbers of wireless communication standards and wireless stations, among which contention for the same frequency band takes place, the longer the transmission deferral time tends to be. When many wireless communication standards for systems other than the wireless LAN system, such as a LAA system are used, in the future, in addition to an increase in the number of wireless stations in a single wireless LAN system, traffic based on a wireless communication standard for a system other than the wireless LAN system, such as the LAA system, is carried in an unlicensed band. Thus, it is considered that the transmission deferral time is lengthened more and more. Moreover, because in the unlicensed band, a wireless station that performs transmission in a maximum 160 MHz band is also present, there is a concern that the lengthening of the transmission deferral time will have an influence on a wide band.

FIG. 22 illustrates a relationship between two wireless communication standards between which contention for the same frequency band takes place.

In FIG. 22, for example, a wireless LAN system and a LAA system are assumed that comply with two wireless communication standards, that is, a wireless communication standard A and a wireless communication standard B, between which contention for the same frequency band takes place. In a wireless communication environment in which these wireless communication systems are adjacent to each other, a wireless station a1 that complies with the wireless communication standard A and a wireless station b1 that complies with the wireless communication standard B detect wireless frames that are transmitted to each other and regard each other as interference partners. At this point, when the random access control such as CSMA/CA is performed before the wireless station a1 and the wireless station b1 perform transmissions, when wireless frames are detected by each other, while one wireless station performs transmission, the other waits its turn for transmission. For this reason, the time that it takes to wait for transmission is lengthened when compared with a case where the interference partner is not present.

FIG. 23 illustrates an example of a sequence in wireless communication environment with interference.

In FIG. 23, four channels, that is, ch1 to ch 4 are used for the wireless communication standard A, and one channel, that is, a channel ch1 is used for the wireless communication standard B. Thus, for each wireless communication standard, transmission control that is based on CSMA/CA is performed. That is, one wireless station needs to wait its turn for transmission when it is detected that other one wireless station is transmitting a frame and that a transmission channel is not available for transmission. For this reason, the transmission based on the wireless communication standard A can be neither performed over the channel ch1, nor over the channels ch2, ch3, and ch4, during a transmission period for the wireless communication standard B. This serves the cause of decreasing the spectrum efficiency remarkably.

Furthermore, when, for example, wireless communication standards vary among wireless LAN systems, the wireless communication standards A and B may be replaced, for example, with the standard IEEE 802.11ac and the standard IEEE 802.11ax, respectively. The result of the replacement is the same as before. Moreover, this is also true when the wireless station a1 and the wireless station b1 that comply with each of two wireless communication standards, respectively, are accommodated in one housing, and where, as illustrated in FIG. 24, and a master device that is one wireless station as a standard A control and a standard B control is configured is also the same. That is, because the standard A control and the standard B control are different in the wireless communication standard from each other, as illustrated in FIG. 23, there is a need to perform transmission at separate transmission opportunities. This serves the cause of decreasing the spectrum efficiency.

When a plurality of wireless communication standards that uses the same frequency band is exist, this is an example of lengthening the transmission deferral time and decreasing the spectrum efficiency. On the other hand, when, in the wireless LAN system, the transmission deferral time is lengthened in a time-based sharing manner, changing of a channel to be used or reducing of a bandwidth can be performed. When the channel is changed to avoid frame collision, for example, a channel, contention for which takes place among a small number of terminals/stations is selected, and then communication is performed over the selected channel. Furthermore, a method has been studied in which, when the frame collision frequently occurs only on one or several sub-channels in the channel bandwidth that is used, the channel bandwidth is reduced and the sub-channels are not included in communication channels.

FIG. 25 illustrates an example of channel switching based on the wireless communication standard A.

In FIG. 25, for the wireless communication standard A, four channels ch1 to ch4 are switchable, and for the wireless communication standard B, one channel ch1 is used. However, when, for the wireless communication standard A, only continuous channels are available, or when an available channel bandwidth is even-number times the unit channel bandwidth, when the channel ch1 is being used for the wireless communication standard B, the channels ch 3 and ch4 are used for the wireless communication standard A. Thus, the channel ch2 remains unused. Therefore, contention for the use of channels does not take place for the wireless communication standard A and the wireless communication standard B, but the frequency resource that is available by the channel switching cannot be used to a maximum. Furthermore, when an hour rate at which the channels ch3 and ch4 are used for the frame transmission is high, but traffic load for the wireless communication standard B for which the channel ch1 is used is small, an hour rate at which the channel ch1 is used is much lower than those at which the channels ch3 and ch4 are used. That is, the variation in the use frequency among the channels in use also occurs. This serves the cause of decreasing the spectrum efficiency.

A proposition of the present invention is to provide a wireless communication system in which a wireless station manages and control a plurality of wireless communication standards and simultaneously transmits a wireless frame of each wireless communication standard, using FDMA, and a wireless station and a wireless communication method in the wireless communication system.

Means for Solving the Problems

According to a first invention, there is provided a wireless communication system in which a wireless station including a plurality of standard controls corresponding respectively to a plurality of wireless communication standards sharing a frequency resource performs a random access process corresponding to each of the wireless communication standards, obtains a transmission opportunity with the frequency resource used for each wireless communication standard, and transmits a wireless frame, the wireless station includes a simultaneous transmissions management part setting a parameter for the random access process corresponding to each of the plurality of wireless communication standards, for each of the plurality of standard controls, controlling frequencies and transmission start timings based on the plurality of wireless communication standards, and simultaneously transmitting wireless frames of each of the wireless communication standards which obtained the transmission opportunities using Frequency Division Multiple Access (FDMA), and the plurality of standard controls are configured to simultaneously transmit the wireless frames of the plurality of wireless communication standards using FDMA, with the frequency resource which obtained the transmission opportunities by performing the random access process corresponding to each of the plurality of wireless communication standards under the control of the simultaneous transmissions management part.

According to a second invention, there is provided a wireless station which performs a random access process, obtains a transmission opportunity with a frequency resource used for each wireless communication standard, and transmits a wireless frame, with a plurality of standard controls corresponding respectively to a plurality of wireless communication standards sharing a frequency resource, the wireless station including; a simultaneous transmissions management part setting a parameter for the random access process corresponding to each of the plurality of wireless communication standards for each of the plurality of standard controls, controlling frequencies and transmission start timings of the plurality of wireless communication standards, and simultaneously transmitting wireless frames of each of the wireless communication standards which obtained the transmission opportunities using FDMA, in which the plurality of standard controls are configured to simultaneously transmit the wireless frames of the plurality of wireless communication standards using FDMA, with the frequency resource which obtained the transmission opportunities by performing the random access process corresponding to each of the plurality of wireless communication standards under the control of the simultaneous transmissions management part.

In the wireless station according to the second invention, the simultaneous transmissions management part may be configured to set a parameter for a common random access process of the plurality of wireless communication standards, for each of the plurality of standard controls, and the plurality of standard controls may be configured to perform the common random access process, and to simultaneously transmit the wireless frames of the wireless communication standards which obtained the transmission opportunities, using FDMA.

In the wireless station according to the second invention, the simultaneous transmissions management part may be configured to set a parameter for the random access process of each of the wireless communication standards, for each of the plurality of standard controls, and the plurality of standard controls may be configured to perform each of the random access processes, and to simultaneously transmit, using FDMA, the wireless frames of the wireless communication standards which satisfy a condition for obtaining the transmission opportunities. Furthermore, the simultaneous transmissions management part may be configured to control a random access period corresponding to each of the wireless communication standards to be consistent with the longest random access period or a prescribed random access period according to the wireless communication standard.

In the wireless station according to the second invention, the simultaneous transmissions management part may be configured to set a parameter for either of the random access processes of the plurality of wireless communication standards, for each of the plurality of standard controls, and the plurality of standard controls may be configured to perform the either of the random access processes, and to simultaneously transmit the wireless frames of the wireless communication standards which obtained the transmission opportunities using FDMA.

In the wireless station according to the second invention, the plurality of standard controls may be configured to perform the random access processes corresponding to the plurality of wireless communication standards, if there is one wireless communication standard which obtained the transmission opportunity to switch to the one wireless communication standard only and transmit a wireless frame.

In the wireless station according to the second invention, the plurality of standard controls may be configured to perform simultaneous transmissions using the FDMA after performing a control sequence of a prescribed wireless communication standard; and the control sequence notifies information on a NAV (Network Allocation Vector) period for an other wireless station and on the frequency resource used for the simultaneous transmissions. Furthermore, after performing the control sequence of the prescribed wireless communication standard, a standard control of a wireless communication standard other than the prescribed wireless communication standard may be configured to perform a random access process corresponding to the wireless communication standard, obtain the transmission opportunities, and perform the simultaneous transmissions together with a wireless frame of the prescribed wireless communication standard using FDMA.

According to a third invention, there is provided a wireless communication method which performs a random access process, obtains a transmission opportunity with a frequency resource used for each wireless communication standard, and transmits a wireless frame, with a plurality of standard controls corresponding respectively to a plurality of wireless communication standards sharing a frequency resource, the wireless communication method including; a step in which a simultaneous transmissions management part sets a parameter for the random access process corresponding to each of the plurality of wireless communication standards, for each of the plurality of standard controls, controls frequencies and transmission start timings based on the plurality of wireless communication standards, and simultaneously transmits, using FDMA, wireless frames of each of the wireless communication standards which obtained the transmission opportunities, in which the plurality of standard controls simultaneously transmit the wireless frames of the plurality of wireless communication standards using FDMA, with the frequency resource which obtained the transmission opportunities by performing the random access process corresponding to each of the wireless communication standards under the control of the simultaneous transmissions management part.

Effects

According to the present invention, under an environment where communications based on a plurality of wireless communication standards that shares a frequency resource are present in a mixed manner, wireless frames of the plurality of wireless communication standards are simultaneously transmitted using FDMA, with the frequency resource, the transmission opportunity for which is obtained, by a random access process that corresponds to each of the wireless communication standards. Thus, because the frequency resource can be utilized to a maximum for every wireless communication standard when compared with a case where time-based sharing is performed for every wireless communication standard, frequency efficient can be improved.

Furthermore, unlike when the frequency resource is switched, all frequency resources are always in an available state. Because of this, when traffic load on one or several of the wireless communication standards are small, transmissions are possibly performed at a high data rate over all frequency resources based on other wireless communication standards.

Furthermore, a plurality of wireless communication standards are operated under the same access control, while in a convention method, communication by a wireless communication standard is autonomously access-controlled. Because of this, the use of the frequency resource becomes possible to be controlled in a concentrated manner by the plurality of wireless communication standards, and as a result, distribution of the frequency resources can be optimized. Moreover, because a plurality of different wireless communication standards can be handled in one wireless station, a decrease in equipment cost or power saving is possible.

BRIEF DESCRIPTION OF DRAWINGS

FIG. 6 is a diagram illustrating a first embodiment of a method of simultaneous transmissions that use FDMA, according to the present invention.

FIG. 7 is a diagram illustrating a second embodiment of the method of simultaneous transmissions that use FDMA, according to the present invention.

DETAILED DESCRIPTION OF THE EMBODIMENTS

Figure 1:
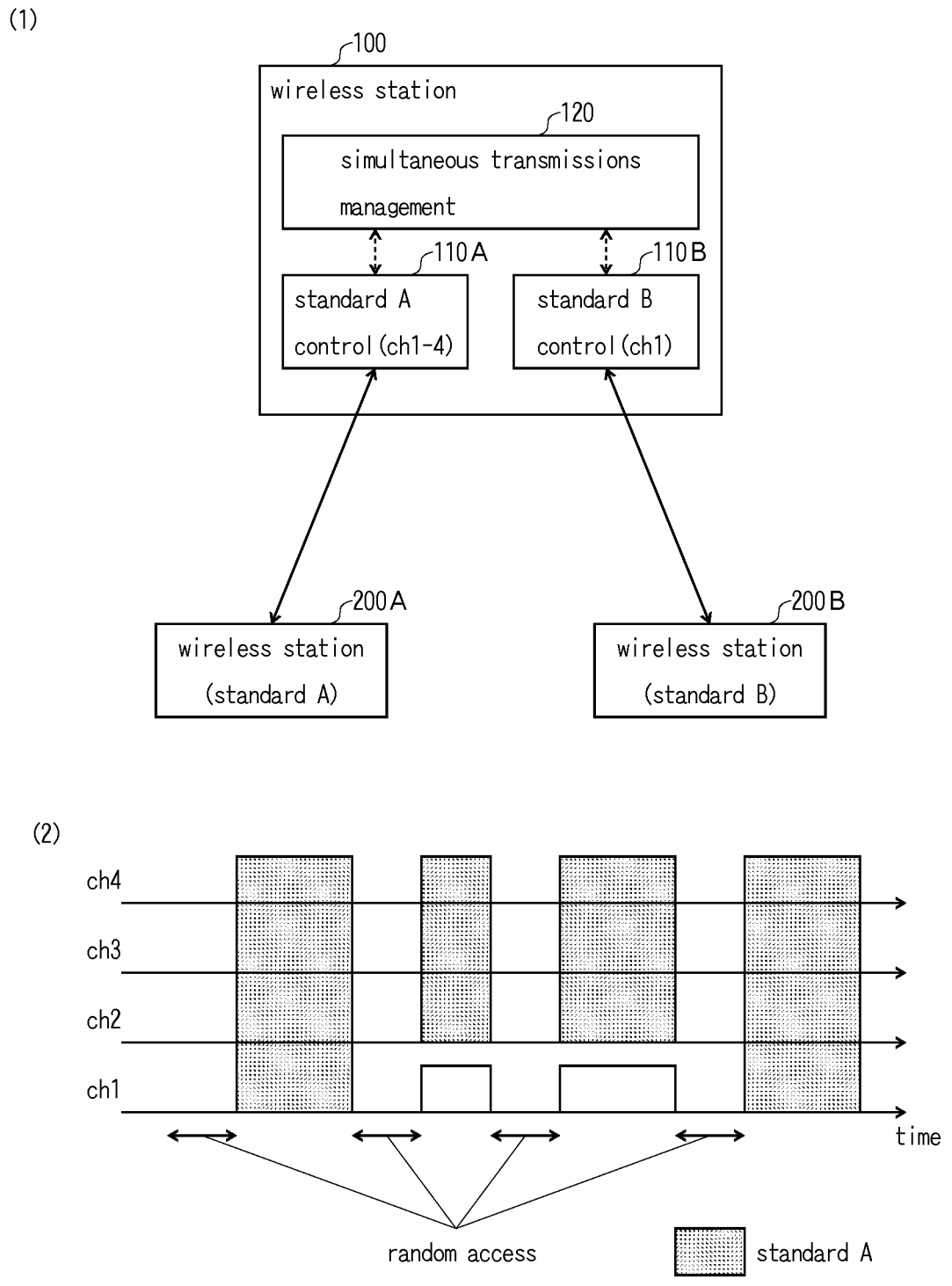
FIG. 1 is a diagram illustrating a configurational example of a wireless communication system according to the present invention.

FIG. 1 illustrates a configurational example of a wireless communication system.

In FIG. 1 the wireless communication system according to the present invention is configured with a wireless station 100 that complies with wireless communication standards A and B, a wireless station 200A based on the wireless communication standard A, which communicates with the wireless station 100, and a wireless station 200B based on the wireless communication standard B, which communicates with the wireless station 100. As a principal configuration, the wireless station 100 includes a standard A control 110A that performs communication based on the wireless communication standard A, a standard B control 110B that performs communication based on the wireless communication standard B, and a simultaneous transmissions management part 120 that executes a random access process through each of the standard A control 110A and the standard B control 110B, and performs simultaneous transmissions control that uses FDMA, for compliance with the wireless communication standards A and B.

At this point, the wireless communication standards A and B assume a case that corresponds to, for example, a wireless LAN system and a LAA system which use the same unlicensed band, and a case that corresponds to IEEE 802.11ac standard, IEEE 802.11ax standard, or the like for, for example, the wireless LAN system, as one wireless communication standard that uses an unlicensed band. As an example, the former case in which the random access process is almost shared will be described below. However, because the random access process is shared in the latter case, the simultaneous transmissions control is simpler.

Under the control of the simultaneous transmissions management part 120, common or individual random access process is performed and simultaneous transmissions that use FDMA are performed, using any one or all of, for example, channels ch1 to ch4 that include a primary channel in the wireless communication standard A, but using, for example, only channel ch1 based on the wireless communication standard B. At this point, when the wireless communication standards A and B use the random access process that is based on the same requirement, a parameter necessary for obtaining a transmission opportunity is set to be shared. Furthermore, with the simultaneous transmissions management part 120, although simultaneous transmissions are performed in parallel based on the wireless communication standards A and B, control is performed that adjusts frequencies of and transmission start timings of signals that are to be transmitted based on the wireless communication standards A and B, in order that interference power that the simultaneous transmissions exert on each other is suppressed to a minimum. It is noted that a case where transmission is performed after the random access process is twice performed based on one wireless communication standard is also included in the control which adjusts transmission start timings of wireless frames that are to be transmitted based on the wireless communication standards A and B. A configurational example of a wireless station will be described in detail below.

Figure 2:
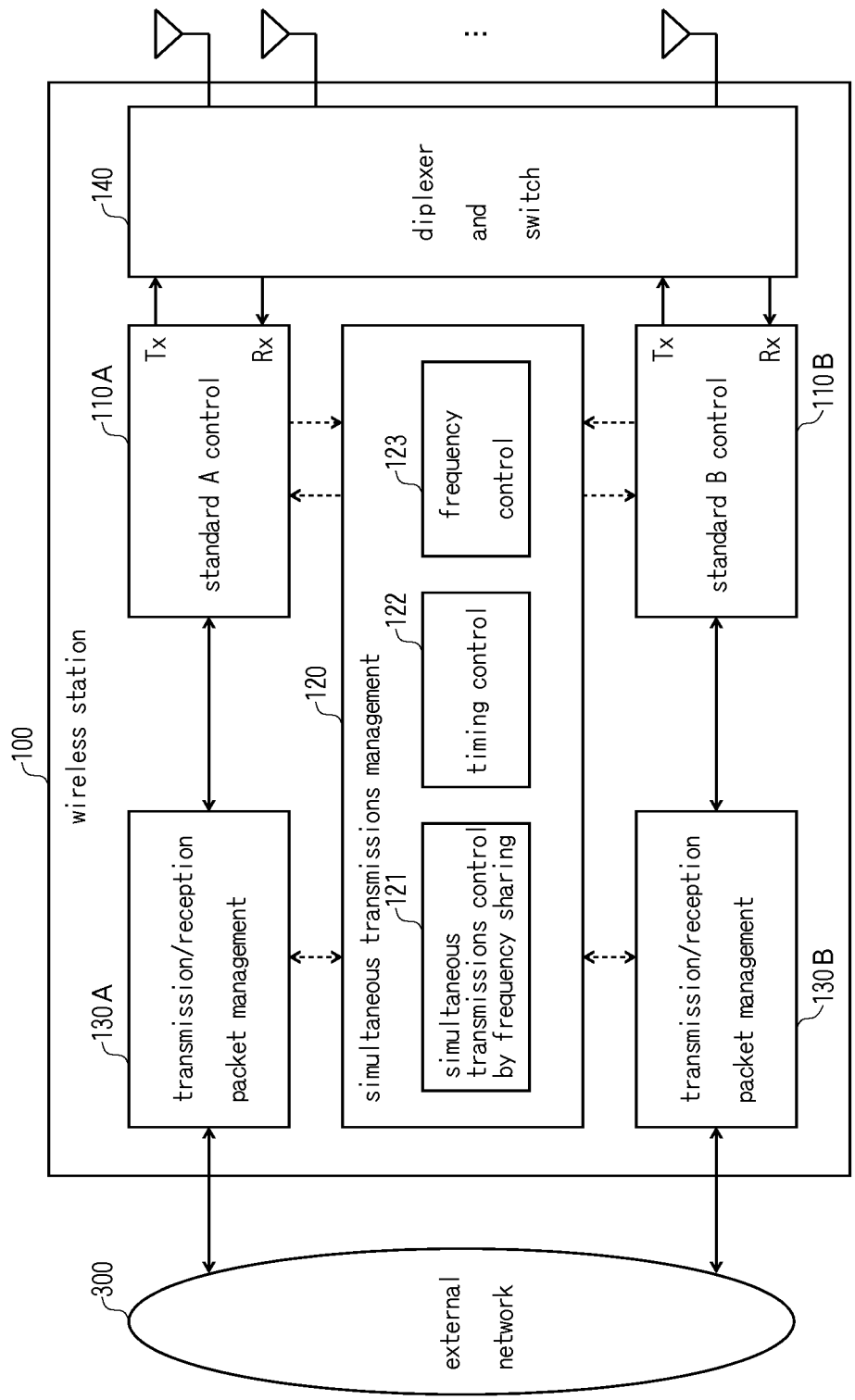
FIG. 2 is a diagram illustrating a first configurational example of a wireless station according to the present invention.

FIG. 2 illustrates a first configurational example of a wireless station according to the present invention.

In FIG. 2, in addition to the standard A control 110A, the standard B control 110B, and the simultaneous transmissions management part 120 in a basic configuration, which are illustrated in FIG. 1, a wireless station 100 is configured with transmission and reception packet management parts 130A and 130B that correspond to the wireless communication standards A and B, respectively, and a diplexer and switch 140 that makes a connection to a plurality of antennas.

The transmission and reception packet management parts 130A and 130B perform transmission and reception processing and scheduling of a packet between an external network 300 and each of the standard A control 110A and the standard B control 110B, and exchanges metadata such as data on the presence or absence of or a size of the packet through the simultaneous transmissions management part 120. When random access control is performed in the standard A control 110A and the standard B control 110B and a transmission opportunity is obtained, a transmission packet based on each of the wireless communication standards A and B is transmitted as wireless frame from an antenna through the diplexer and switch 140.

The simultaneous transmissions management part 120, which is configured with a simultaneous transmission control 121 by frequency sharing, a timing control block 122, and a frequency control block 123, controls the random access processes by the standard A control 110A and the standard B control 110B, and controls the simultaneous transmissions that use FDMA. The timing control block 122 performs control for ensuring consistency in clock synchronization or a transmission start timing. The frequency control block 123 performs control for frequency synchronization in such a manner that, when transmission is performed using FDMA, inter-subchannel interference does not occur between the signals based on the wireless communication standards A and B. The simultaneous transmission control 121 by frequency sharing performs random access control or scheduling of a frequency resource when FDMA is performed. It is noted that each control or each control block may be configured not only in hardware, but may also be configured in software and that in FIG. 2, a logical relationship between each of the controls is illustrated according to a role of each control or each control block. It is noted that a dashed line indicates a path along which control information is transferred and that a solid line indicates a path along which data is transferred.

Figure 3:
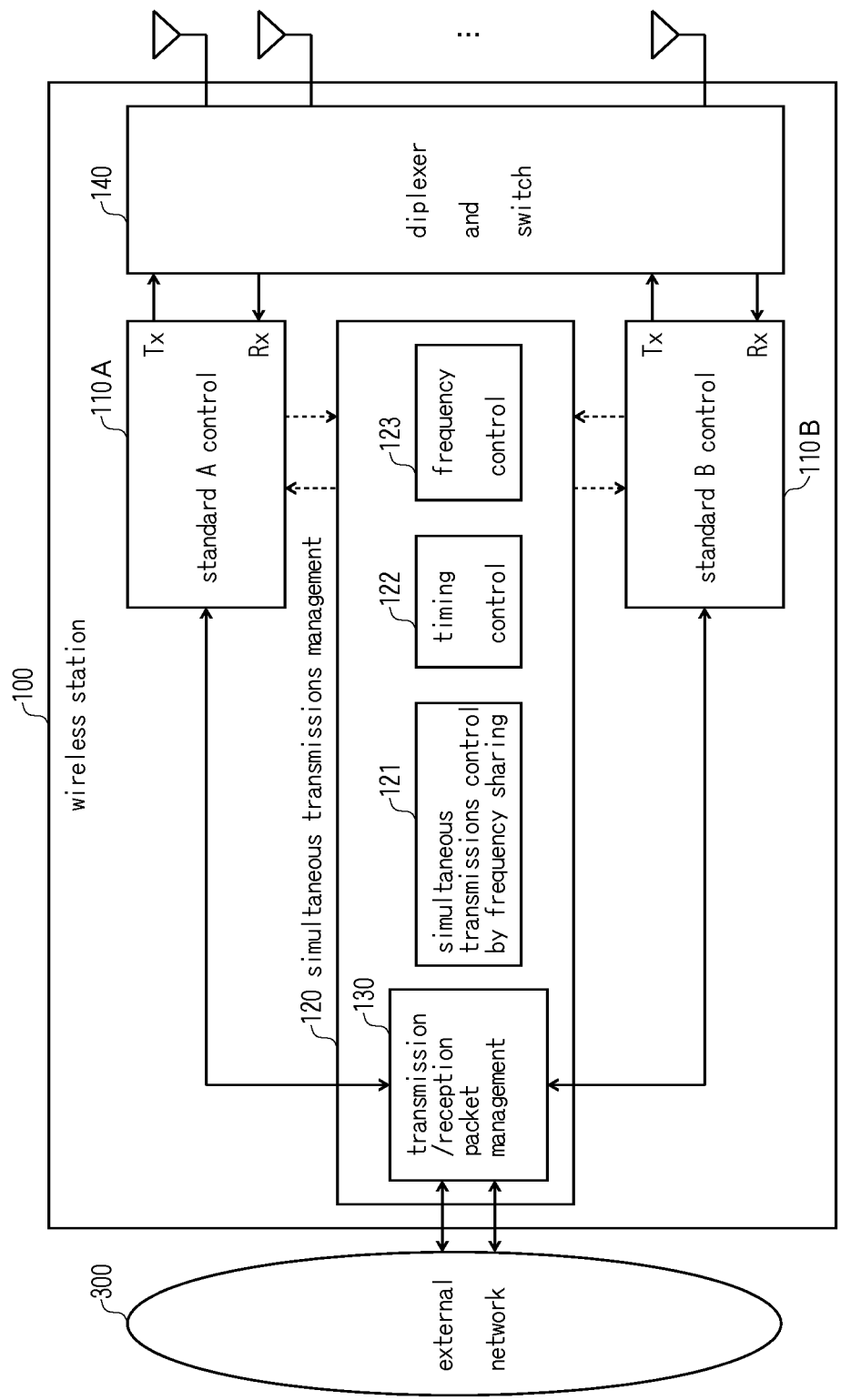
FIG. 3 is a diagram illustrating a second configurational example of the wireless station according to the present invention.

FIG. 3 illustrates a second configurational example of the wireless station according to the present invention.

In FIG. 3, a wireless station in the second configurational example has a configuration in which the transmission and reception packet management parts 130A and 130B in the first configurational example are shared and are accommodated in the simultaneous transmissions management part 120. Other configurations are the same as those in the first configurational example.

Figure 4:
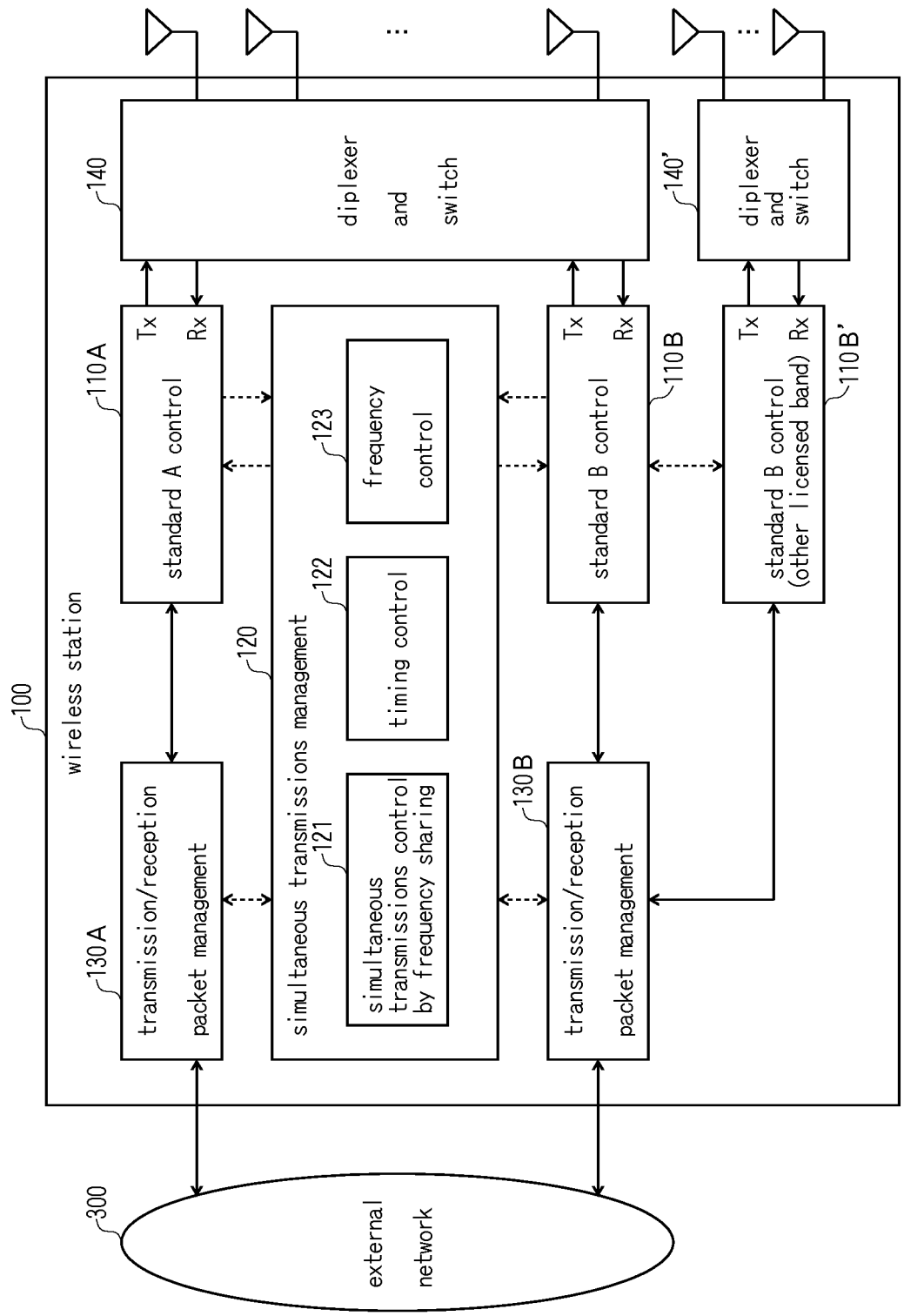
FIG. 4 is a diagram illustrating a third configurational example of the wireless station according to the present invention.

FIG. 4 illustrates a third configurational example of the wireless station according to the present invention.

In FIG. 4, the wireless communication standards A and B in the first configurational example assume, for example, the wireless LAN system and the LAA system that use the same unlicensed band, but it is assumed that a licensed band other than the unlicensed band is also used together based on the wireless communication standard B. In addition to the configuration of the wireless station 100 in the first configurational example, a wireless station 100 in the third configurational example includes a standard B control 110B' that uses a licensed band, and a diplexer and switch 140'. The standard B controls 110B and 110B' are connected to the transmission and reception packet management part 130B according to channels over which transmission and reception are performed.

Figure 5:
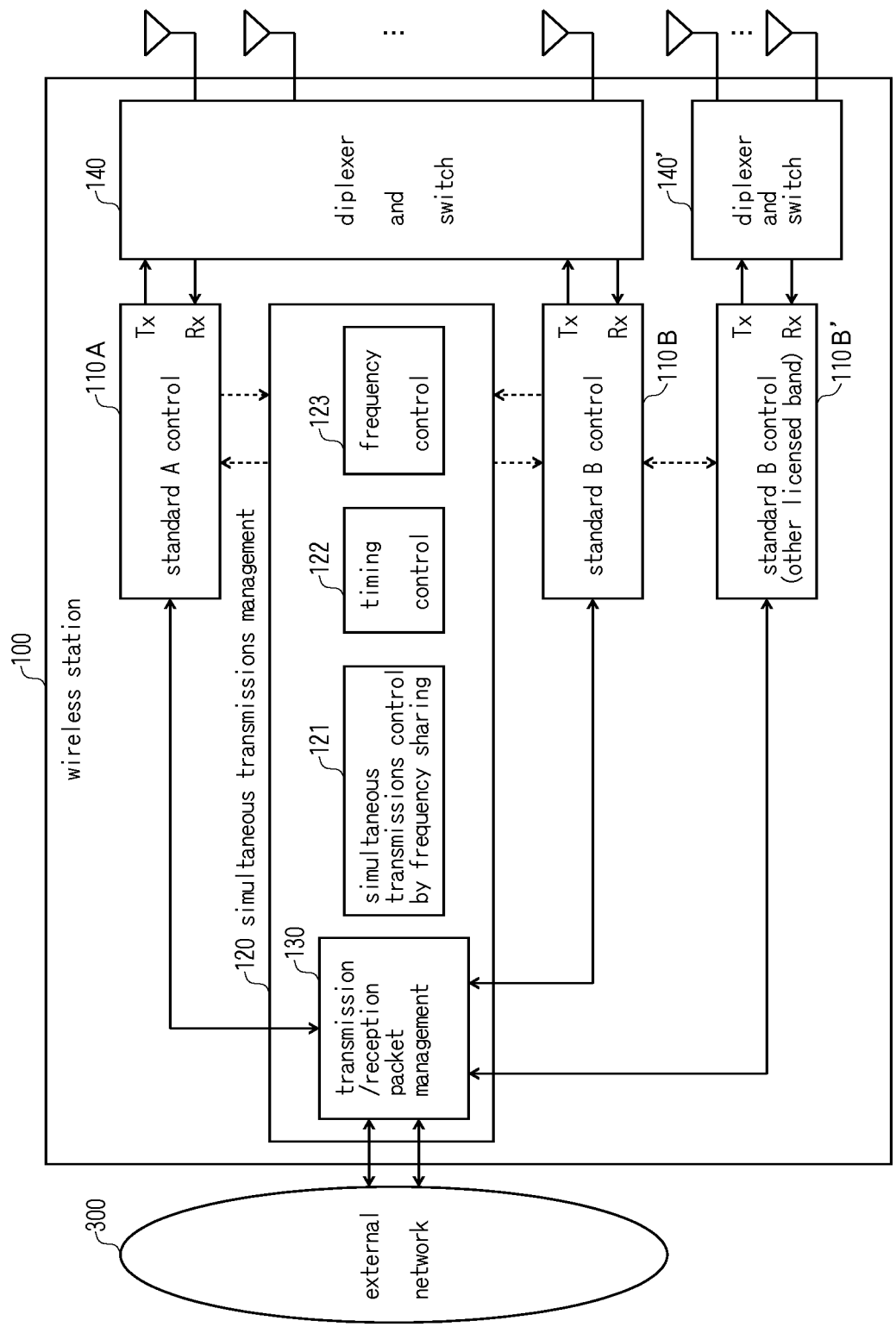
FIG. 5 is a diagram illustrating a fourth configurational example of the wireless station according to the present invention.

FIG. 5 illustrates a fourth configurational example of the wireless station according to the present invention.

In FIG. 5, a wireless station in the fourth configurational example has a configuration in which the transmission/reception packet management parts 130A and 130B in the third configurational example are shared and are accommodated in the simultaneous transmissions management part 120. Other configurations are the same as those in the third configurational example.

In the wireless station 100 according to the present invention, which has configurations that are illustrated in the first configurational example in FIG. 2 to the fourth configurational example in FIG. 5, respectively, which are described above, the standard A control 110A and the standard B control 110B perform the random access process under the control of the simultaneous transmissions management part 120 and thus obtains a transmission opportunity, control a frequency and a transmission start timing in each channel that is used for simultaneous transmissions, and simultaneously transmit a wireless frame of each of the wireless communication standard A and the wireless communication standard B, using FDMA.

First to fourth embodiments of a method of simultaneous transmissions that use FDMA, followed by first to fourth examples of random access processes based on the wireless communication standards A and B, followed by first to eighth examples of simultaneous transmissions processing in the random access processes based on the wireless communication standards A and B will be described below.

First Embodiment of a Method of the Simultaneous Transmissions that Use FDMA

FIG. 6 is a first embodiment of a method of the simultaneous transmissions that use FDMA, according to the present invention.

FIG. 6, the wireless station 100 performs the random access process based on the wireless communication standard A and the random access process based on the wireless communication standard B, and performs carrier sensing during prescribed random access periods, over the channels ch1 to ch4 that are used based on the wireless communication standard A and over the channel ch1 that is used based on the wireless communication standard B, respectively. When the random access period expires, where each channel is idle, and thus where a transmission opportunity can be obtained, the wireless frame of the wireless communication standard A and the wireless frame of the wireless communication standard B are simultaneously transmitted over the channels ch2 to ch4 and over the channel ch1, respectively, using FDMA. Because the simultaneous transmissions management part 120 of the wireless station 100 performs the control that adjusts the frequencies of and the transmission start timings of the signals that are to be transmitted based on each of the wireless communication standards, although the simultaneous transmissions are performed in parallel, the interference power that the simultaneous transmissions exert on each other can be suppressed to a minimum.

Second Embodiment of the Method of the Simultaneous Transmissions that Use FDMA

FIG. 7 is a second embodiment of the method of the simultaneous transmissions that use FDMA, according to the present invention.

In FIG. 7, the wireless station 100 performs the random access process based on the wireless communication standard A and the random access process based on the wireless communication standard B, and simultaneously transmits the wireless frame of the wireless communication standard A and the wireless frame of the wireless communication standard B, over the channels ch2 to ch4 and over the channel ch1, respectively, using FDMA.

At this point, when a frame time length based on the wireless communication standard A is shorter than a frame time length based on the wireless communication standard B, adjustment for making the frame time lengths uniform is made. The adjustment of the frame time lengths can be made with padding, frame extension, or fragmentation, and a transfer rate change. The padding is for adjusting the frame time length by adding a bit sequence. The frame extension is for adjusting the frame time length by maintaining the same transmission power level after frame completion and continuing to transmit a signal. The fragmentation is for indicating that a frame is divided into block units that are smaller than those of a normal frame. The frame time length is adjusted by adding a frame part that results from the division to a frame whose frame time length is desired to extend.

Furthermore, when the wireless communication standard B is for the LAA system, a symbol length, a transmission slot time length, a subframe time length and a frame time length of an LTE frame are stipulated, and pieces of information thereon can be acquired from a licensed band for exchanging control frames or the like. The wireless station 100 can know in advance a time when transmission of a wireless frame for the LAA system is completed, by utilizing these pieces of information, and can make uniform frame time lengths for the wireless LAN system, which complies with the wireless communication standard A.

It is noted that, when the frame time length based on one wireless communication standard is shorter than the frame time length based on the other wireless communication standard, the frame time lengths may not be made uniform. When although another station transmits a frame over a channel over which communication is performed based on each of the wireless communication standards A and B, it is difficult for inter-channel interference to occur and where a wireless frame that is destined for the wireless station 100 itself, based on the wireless communication standard with the shorter frame time length does not take place, channel use of a channel, the frame transmission over which is completed earlier, may be stopped immediately without making uniform the frame time lengths and another wireless station that is present within the same area may be in a state of being able to use the channel.

Third Embodiment of the Method of the Simultaneous Transmissions that Use FDMA

Figure 8:
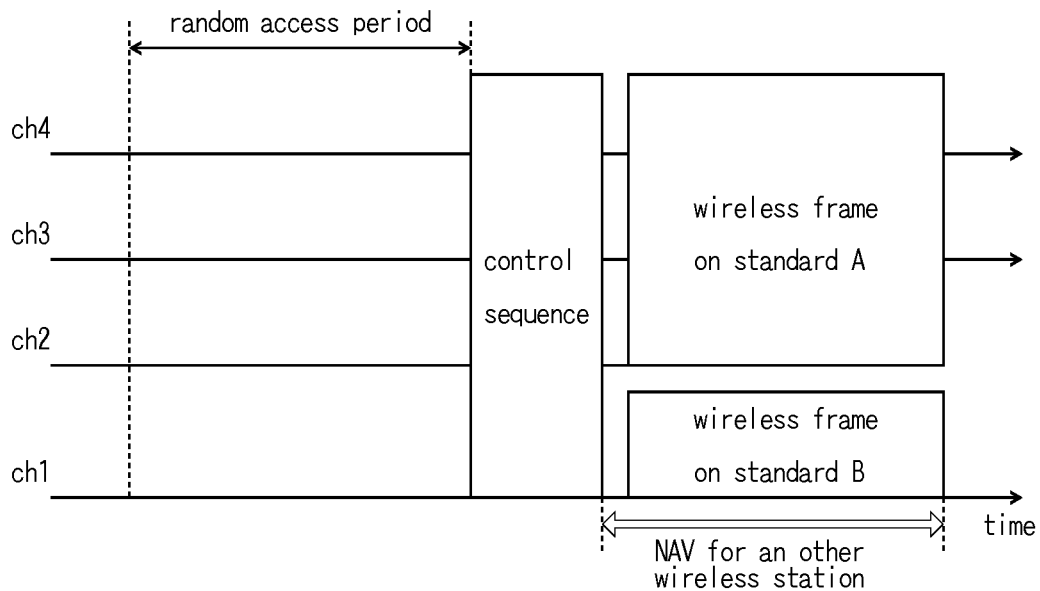
FIG. 8 is a diagram illustrating a third embodiment of the method of simultaneous transmissions that use FDMA, according to the present invention.

FIG. 8 illustrates a third embodiment of the method of the simultaneous transmissions that use FDMA, according to the present invention.

In FIG. 8, before the simultaneous transmissions are performed based on the wireless communication standards A and B, the wireless station 100 sets a NAV period for a neighboring wireless station, using a sequence for control that includes exchange of frame single bodies for control and of frames of control. As the frame for control, at least a frame is used whose frame contents are possibly recognized by a terminal/station that performs the communication based on the wireless communication standard A or the wireless communication standard B. By transmitting the frame for control in advance, suitable NAV setting can be performed on a wireless station that possibly recognizes contents of the frame for control, and can prevent interruption while frame transmission is progress. Furthermore, using the control frame, pieces of frequency resource information can be in advance exchanged that is used for data transmission in a wireless station between transmission and reception based on the wireless communication standard A or the wireless communication standard B.

For example, the wireless communication standard A is set for the wireless LAN system, the wireless communication standard B is set for the LAA system, and the frame for control is set to be a control frame that is a wireless LAN frame. In this case, when the control frame is not transmitted in advance to set the NAV, a neighboring wireless LAN station performs the carrier sensing of an LAA frame over the channel ch1, at a value that is higher by 20 dB than a carrier sensing level of a wireless LAN signal. For this reason, although transmission power densities are the same in the channels ch2 to ch4 and the channel ch1, results of the carrier sensing are different, and there is a likelihood that the neighboring wireless LAN station will start transmission during a period for transmission of the LAA frame over the channel ch1. When the neighboring wireless LAN station starts the transmission, transfer quality of the LAA frame is degraded and there is a concern that the degradation will lead to a decrease in throughput.

Figure 9:
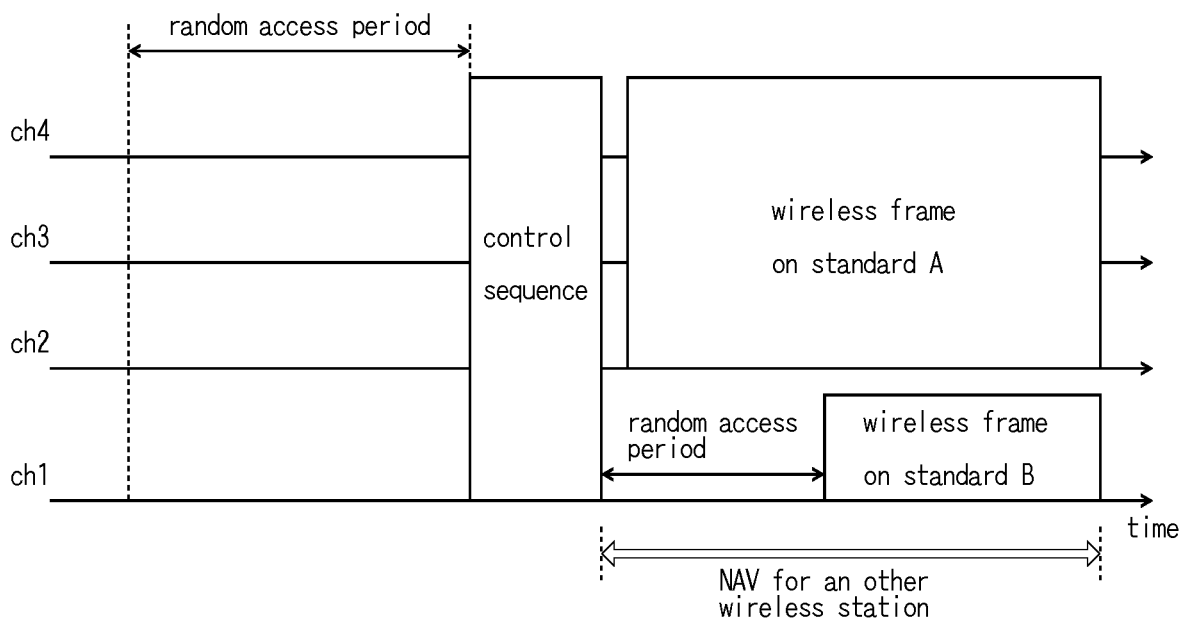
FIG. 9 is a diagram illustrating a fourth embodiment of the method of simultaneous transmissions that use FDMA, according to the present invention.

Fourth Embodiment of the Method of the Simultaneous Transmissions that Use FDMA FIG. 9 illustrates a fourth embodiment of the method of the simultaneous transmissions that use FDMA, according to the present invention.

In FIG. 9, the wireless station 100 transmits the frame for control before performing the simultaneous transmissions based on the wireless communication standards A and B in the same manner as in the third embodiment, and sets the NAV (network allocation vector) period for the neighboring wireless station. Moreover, the wireless station 100 performs the random access process again based on the wireless communication standard B until the transmission based on the wireless communication standard B is started. When the random access process is independent of the wireless communication standard A and the wireless communication standard B, NAV setting is performed in advance using the method according to the third embodiment, and the number of the wireless terminals/stations, among which there is contention, is suppressed from increasing and then a transmission opportunity is obtained. Because of this, an effect of improving a rate at which transmission opportunity based on the wireless communication standard B is obtained can be expected. That is, because with the frame for control, the NAV is set in advance for the neighboring wireless station, the number of the neighboring wireless stations, among which there is contention during a random access period based on the wireless communication standard B, decreases, and a transmission opportunity is easy to acquire.

Figure 10:
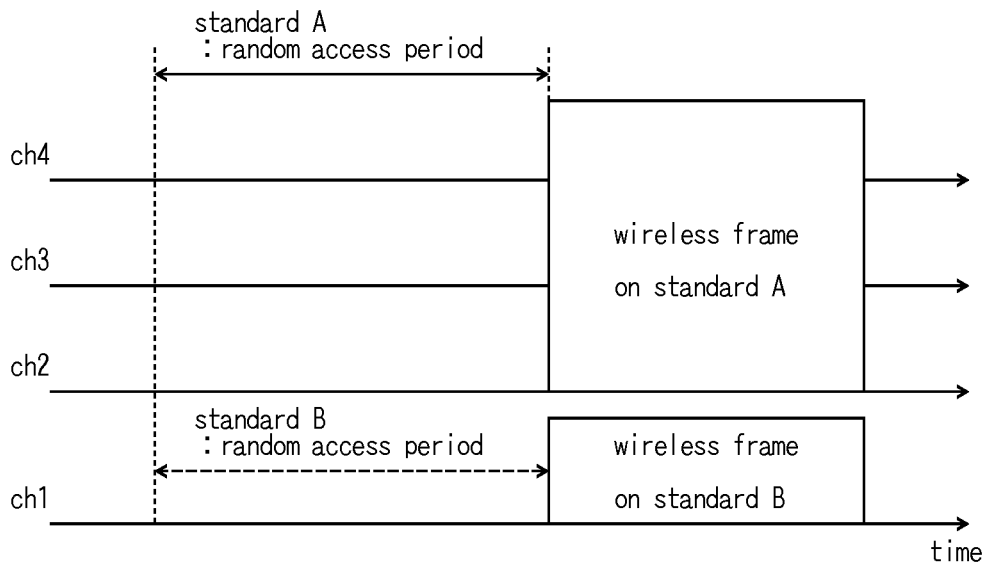
FIG. 10 is a diagram for describing a first example of random access processes based on wireless communication standards A and B.

First Example of the Random Access Processes Based on the Wireless Communication Standards A and B FIG. 10 illustrates a first example of the random access processes based on the wireless communication standards A and B.

In FIG. 10, when the simultaneous transmissions are performed using the random access process, the wireless communication standards A and B for which are based in the same stipulation, the simultaneous transmissions management part 120 sets a common parameter necessary for obtaining a transmission opportunity in a random access manner, for the standard A control 110A and the standard B control 110B to perform the same control. For example, in the LAA system, the random access period that is necessary for the carrier sensing is calculated with "defer duration+random backoff," a setting range of each of the defer duration and the random backoff varies with a priority level of frame transmission. The defer duration and the random backoff that are set in the LAA system are calculated as follows.

Random access period=defer duration+random backoff defer duration=$T\!f+mp*Ts$ random backoff=$CWp*Ts$ In the formula for calculation, Tf is 16 μsec, and Ts is 9 μsec. The formula for calculation described above or a fixed parameter is equal to that in IEEE 802.11a/n/ac/ax or the like for the wireless LAN system. Furthermore, a setting value of mp and a setting range of CWp for the LAA system are setting values that are considerably similar to an Arbitration inter Frame Space Number (AIFSN) and a CW range, respectively, for the wireless LAN system. Therefore, in the wireless station 100, it is determined that the wireless LAN system and the LAA system are the same random access process, the same parameter is shared, and the simultaneous transmissions control can be performed.

At this point, the wireless communication standard A is set to be for the wireless LAN system, and the wireless communication standard B is set to be for the LAA system. When the AIFSN for the wireless LAN system and mp for the LAA system are different values or CW sizes thereof are different, the simultaneous transmissions management part 120 of the wireless station 100 selects a value of the greater of the AIFSN and mp or a value of the greater of the CW sizes thereof. The standard A control 110A and the standard B control 110B calculate the common random access period based on the selected value, and perform the carrier sensing.

The wireless LAN system performs the carrier sensing over all the channels ch1 to ch4 including a primary channel ch4, over which transmission is performed, and the LAA system performs the carrier sensing over only the channel ch1 over which transmission is possible. In the present example, the LAA system is assumed not to perform multi-channel communication. If, with a result that is obtained each time the carrier sensing is performed, after the random access period expires, it is determined that a channel is idle, the wireless LAN system and the LAA system start the simultaneous transmissions over the channels ch2 to ch4 and over the channel ch1, respectively, using FDMA.

Furthermore, when the wireless communication standards A and B are, for example, the standard IEEE 802.11ac and the standard IEEE 802.11ax, respectively, for the wireless LAN system and where a primary channel that is common to the wireless communication standards A and B is set, for example, for the channel ch1, this can be supported with the same random access process. For example, the simultaneous transmissions are started over the primary channel ch1 and over the secondary channels ch2 to ch4, based on the wireless communication standard B and the wireless communication standard A, respectively, using FDMA. This channel setting for each of the wireless communication standards can be notified to the wireless station on the receiving side by performing signaling processing.

Figure 11:
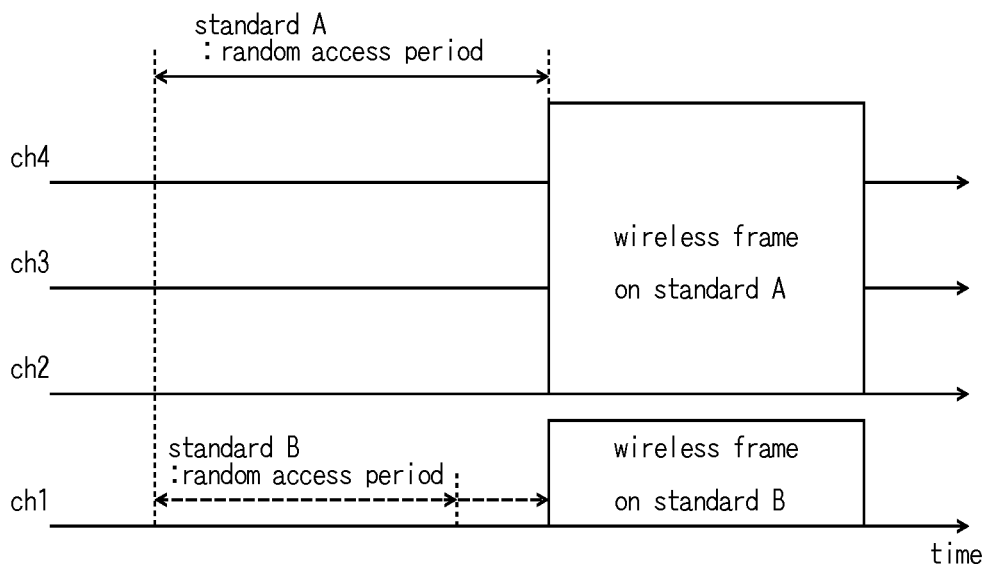
FIG. 11 is a diagram for describing a second example of the random access processes based on the wireless communication standards A and B.

Second Example of the Random Access Processes Based on the Wireless Communication Standards A and B FIG. 11 illustrates a second example of the random access processes based on the wireless communication standards A and B.

In FIG. 11, when the standard A control 110A and the standard B control 110B of the wireless station 100 attempt to obtain transmission opportunities according to the random access processes that are based on their respective standards and where a condition for both to be able to obtain the transmission opportunities together is satisfied, the transmission opportunity for the simultaneous transmissions is regarded as being obtained for the first time.

At this point, the wireless communication standard A is set to be for the wireless LAN system, and the wireless communication standard B is set to be for the LAA system. The wireless LAN system and the LAA system start the carrier sensing at the same timing. The wireless LAN system, for example, performs the carrier sensing over all the channels ch1 to ch4 including the primary channel ch4, over which the transmission is performed, and the LAA system performs the carrier sensing over only the channel ch1 over which the transmission is possible. In the present example, the random access period expires earlier in the LAA system that in the wireless LAN system. However, the LAA system does not transmit a wireless frame immediately after the random access period in order to perform the simultaneous transmissions along with the wireless LAN system. The standard B control 110B acquires control information from the simultaneous transmission control 121 by frequency sharing, and continuously performs the carrier sensing until the random access period in the wireless LAN system expires. Then, after the random access period in the wireless LAN system expires, if it is determined that a channel is idle, the wireless LAN system and the LAA system start the simultaneous transmissions over the channels ch2 to ch4 and over the channel ch1, respectively, using FDMA.

Figure 12:
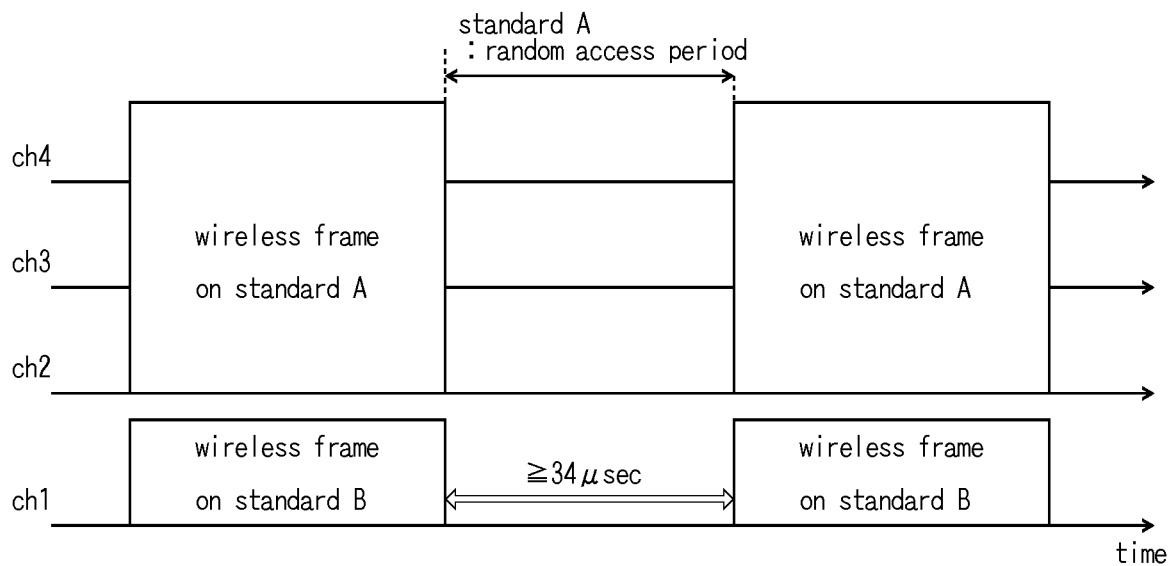
FIG. 12 is a diagram for describing a third example of the random access processes based on the wireless communication standards A and B.

Third Example of the Random Access Processes Based on the Wireless Communication Standards A and B FIG. 12 illustrates a third example of the random access processes based on the wireless communication standards A and B.

At this point, the wireless communication standard A is set to be for the wireless LAN system, the wireless communication standard B is set to be for the LAA system, and the LAA system is set to perform burst communication over the channel ch1.

As disclosed in NPL 4, when, in the burst communication, a wireless frame is transmitted one time, and then a wireless frame is transmitted continuously, the carrier sensing is stipulated as not being performed for a length of time that is equal to or longer than 34 µsec. For this reason, the wireless LAN system sets the random access period that is at least 34 µsec, and performs the carrier sensing. On the other hand, when a length of random access period for the wireless LAN system is equal to or longer than 34 µsec without the random access period for the wireless LAA system being excluded from calculated, the carrier sensing is set to be performed only for the same time.

Figure 13:
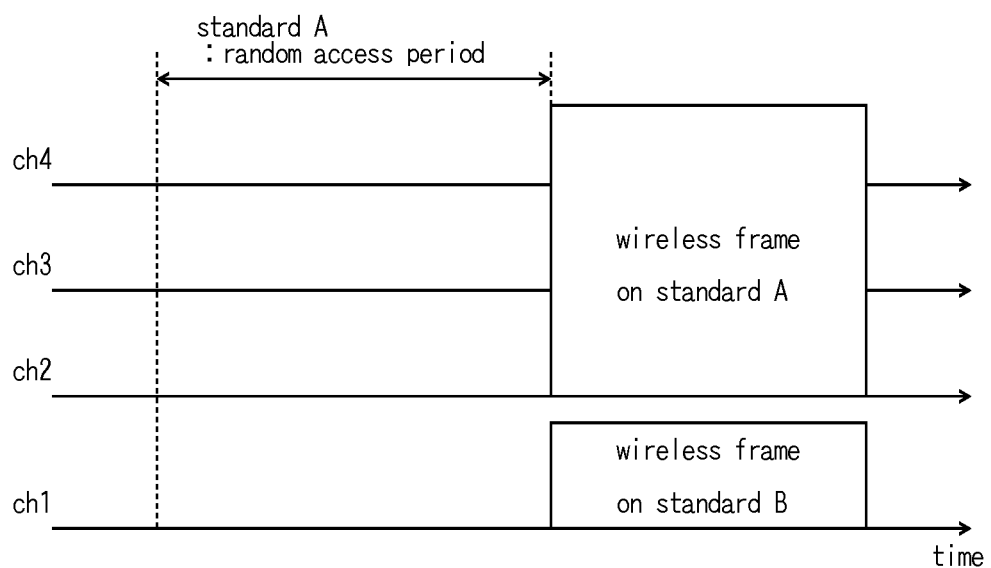
FIG. 13 is a diagram for describing a fourth example of the random access processes based on the wireless communication standards A and B.

Fourth Example of the Random Access Processes Based on the Wireless Communication Standards A and B FIG. 13 illustrates a fourth example of the random access processes based on the wireless communication standards A and B.

At this point, the wireless communication standards A and B may be for the wireless LAN system and the LAA system, and may be different wireless communication standards for the wireless LAN system. The wireless station 100 performs the random access process that is based on any one of the wireless communication standards. However, when performing the carrier sensing, the carrier sensing is performed on all channels that are scheduled for use, with the other wireless communication standard being included.

For example, when the wireless LAN system uses the channels ch2 to ch4 and the LAA system uses the channel ch1, only carrier sensing in one of the wireless LAN system and the LAA system, which is equal to or is always longer than carrier sensing of the other, is performed over the channels ch1 to ch4. In the present example, only the wireless LAN system performs the carrier sensing over all channels. Then, after the random access period in the wireless LAN system expires, if it is determined that a channel is idle, the wireless LAN system and the LAA system start the simultaneous transmissions over the channels ch2 to ch4 and over the channel ch1, respectively, using FDMA.

Figure 14:
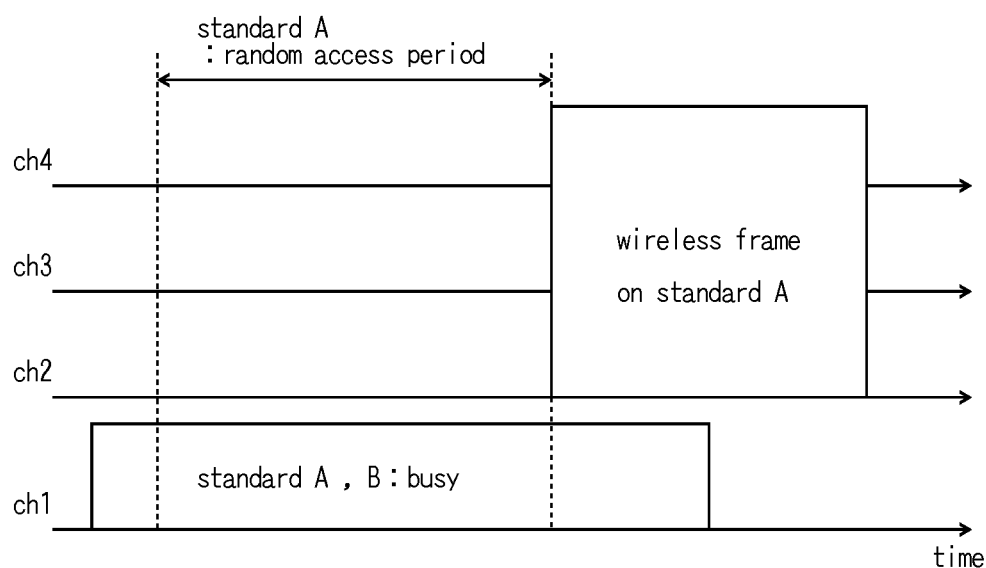
FIG. 14 is a diagram for describing a first example of simultaneous transmissions processing in the random access processes based on the wireless communication standards A and B.

First Example of the Simultaneous Transmissions Processing in the Random Access Processes Based on the Wireless Communication Standards A and B FIG. 14 is a first example of the simultaneous transmissions processing in the random access processes based on the wireless communication standards A and B.

In FIG. 14, when, with both carrier sensing levels of the wireless communication standards A and B, it is determined that the channel ch1 is busy, the transmission that uses FDMA is performed over the channels ch2 to ch4 that are determined as being in an idle state, based on the wireless communication standard A. That is, for example, when the channel ch1 is a primary channel, the transmission is performed over only a secondary channel. This channel setting for the wireless communication standard A can be notified to the wireless station on the receiving side by performing signaling processing.

Figure 15:
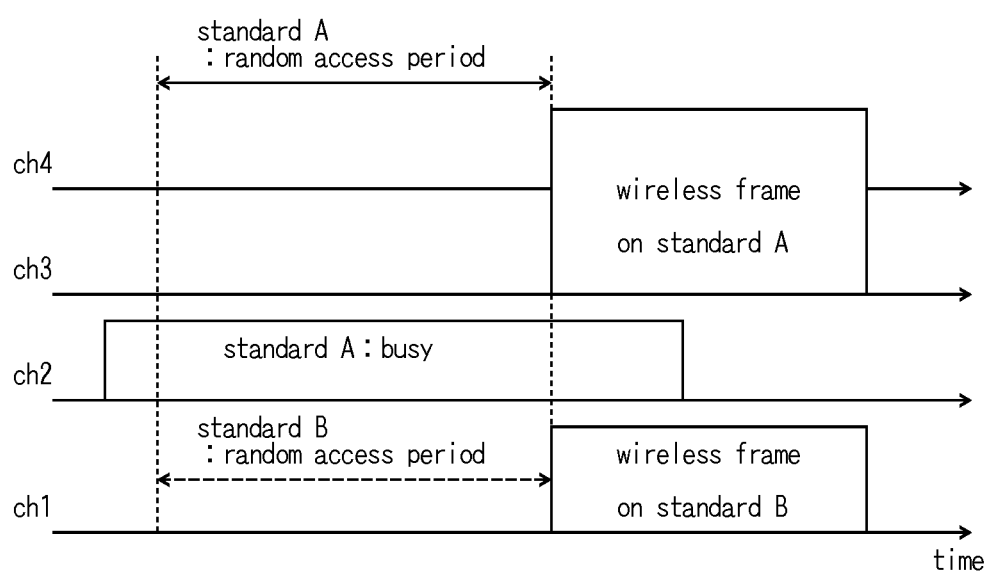
FIG. 15 is a diagram for describing a second example of the simultaneous transmissions processing in the random access processes based on the wireless communication standards A and B.

Second Example of the Simultaneous Transmissions Processing in the Random Access Processes Based on the Wireless Communication Standards A and B FIG. 15 is a second example of the simultaneous transmissions processing in the random access processes based on the wireless communication standards A and B.

In FIG. 15, when, with the carrier sensing based on the wireless communication standard A, it is determined that the channel ch2 is busy, the simultaneous transmissions are performed over the channels ch3 and ch4 that are determined as being in an idle state and over the channel ch1 that is determined as being in an idle state, based on the wireless communication standard A and the wireless communication standard B, respectively, using FDMA. That is, the transmission over discontinuous channels is set to be possible for the simultaneous transmissions that use FDMA. This channel setting for the wireless communication standards A and B can be notified to the wireless station on the receiving side by performing signaling processing.

Figure 16:
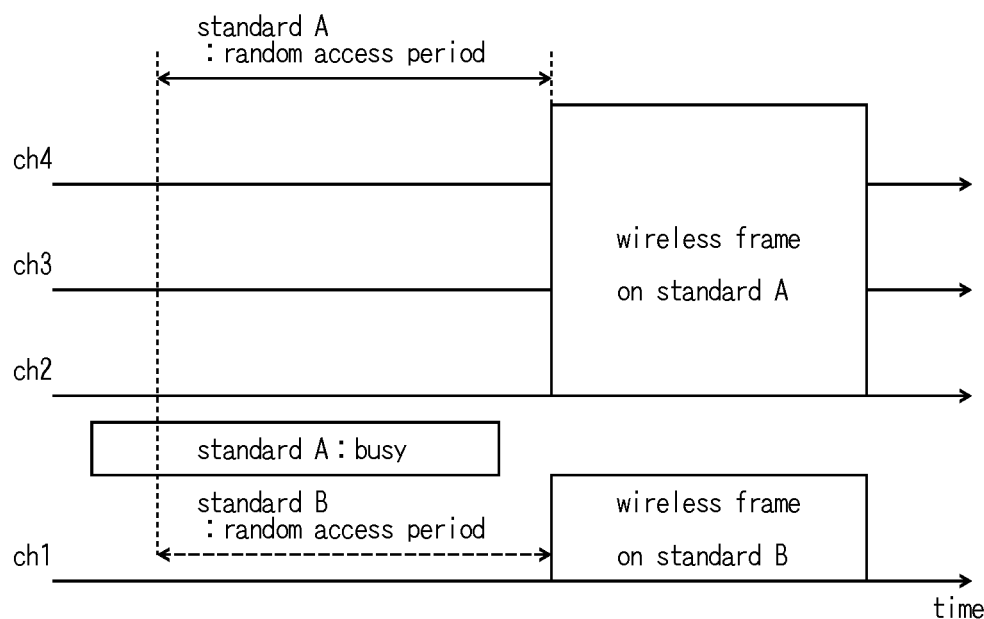
FIG. 16 is a diagram for describing a third example of the simultaneous transmissions processing in the random access processes based on the wireless communication standards A and B.

Third Example of the Simultaneous Transmissions Processing in the Random Access Processes Based on the Wireless Communication Standards A and B FIG. 16 is a third example of the simultaneous transmissions processing in the random access processes based on the wireless communication standards A and B.

In FIG. 16, when it is determined that the channel ch 1 is busy based on the wireless communication standard A, in compliance with the carrier sensing of all channels is performed, and where it is determined that the channel ch1 is idle based on the wireless communication standard B, in compliance with the carrier sensing of the channel ch1 is performed, the simultaneous transmissions are started over the channels ch2 to ch4 and over the channel ch1, based on the wireless communication standards A and B, respectively, using FDMA. This channel setting for the wireless communication standards A and B can be notified to the wireless station on the receiving side by performing signaling processing.

Figure 17:
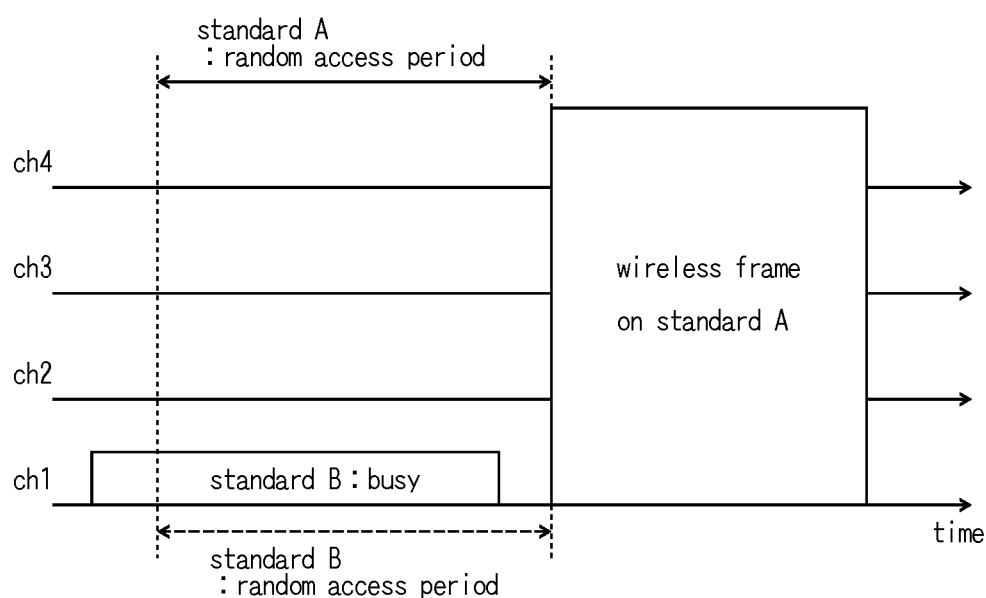
FIG. 17 is a diagram for describing a fourth example of the simultaneous transmissions processing in the random access processes based on the wireless communication standards A and B.

Fourth Example of the Simultaneous Transmissions Processing in the Random Access Processes Based on the Wireless Communication Standards A and B FIG. 17 is a fourth example of the simultaneous transmissions processing in the random access processes based on the wireless communication standards A and B.

In FIG. 17, when it is determined that all channels are idle based on the wireless communication standard A, in compliance with the carrier sensing of all channels is performed, and where it is determined that the channel ch1 is busy based on the wireless communication standard B, in compliance with the carrier sensing of the channel ch1 is performed, the simultaneous transmissions are started over the channels ch1 to ch4 based on the wireless communication standards A, using FDMA. This channel setting for the wireless communication standard A can be notified to the wireless station on the receiving side by performing signaling processing.

Fifth Example of the Simultaneous Transmissions Processing in the Random Access Processes Based on the Wireless Communication Standards A and B In fifth to seventh examples of the simultaneous transmissions processing, which will be described below, in the wireless LAN system in which the carrier sensing is performed over all channels, the primary channel is set to be ch4 based on the wireless communication standard A, and only channel ch1 is set to be used based on the wireless communication standard B.

Figure 18:
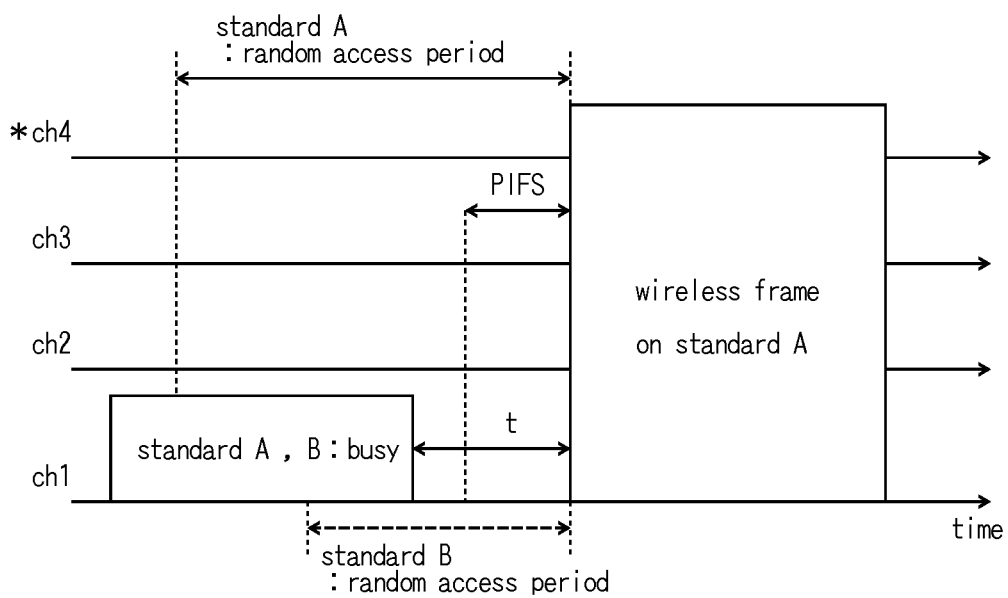
FIG. 18 is a diagram for describing a fifth example of the simultaneous transmissions processing in the random access processes based on the wireless communication standards A and B.

FIG. 18 illustrates a fifth example of the simultaneous transmissions processing in the random access processes based on the wireless communication standards A and B.

In FIG. 18, in order to obtain the transmission opportunity in the wireless LAN system based on the wireless communication standard A, the primary channel ch4 needs to be idle during "defer duration DIFS+random backoff" that is the random access period, but the secondary channels ch1 to ch3 may be idle from a scheduled transmission start time to before a PIFS time. At this point, the channels ch2 to ch4 are idle during the random access period, and the channel ch1 is busy when the carrier sensing starts, but is idle from the scheduled transmission start time to before the PIFS time.

On the other hand, in order to obtain the transmission opportunity based on the wireless communication standard B, the channel ch1 needs to be idle during the random access period. The channel ch1 becomes idle from busy at the carrier sensing level for the wireless communication standard B, but time t prior to the scheduled transmission start time is shorter than the random access period for the wireless communication standard B.

As described above, because the transmission opportunity based on the wireless communication standard B cannot be obtained, the wireless station 100 starts the simultaneous transmissions that use the channel ch1 to ch4, in the wireless LAN system that complies with the wireless communication standard A.

Figure 19:
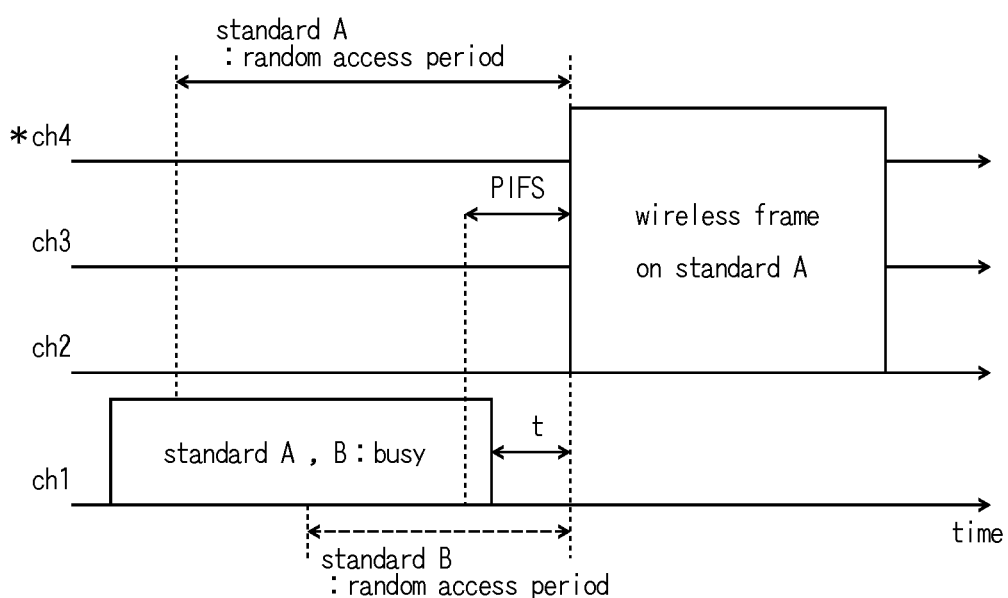
FIG. 19 is a diagram for describing a sixth example of the simultaneous transmissions processing in the random access processes based on the wireless communication standards A and B.

Sixth Example of the Simultaneous Transmissions Processing in the Random Access Processes Based on the Wireless Communication Standards A and B FIG. 19 is a sixth example of the simultaneous transmissions processing in the random access processes based on the wireless communication standards A and B.

In FIG. 19, the channels ch2 to ch4 are idle during the random access period for the wireless communication standard A. The channel ch1 is busy when the carrier sensing starts, and thereafter is idle. However, time t prior to the scheduled transmission start time, for which the channel 1 is idle, is shorter than the PIFS time. Therefore, the wireless station 100 cannot use the channel ch1 in the wireless LAN system that complies with the wireless communication standard A, and starts the transmission over the channels ch2 to ch4.

Figure 20:
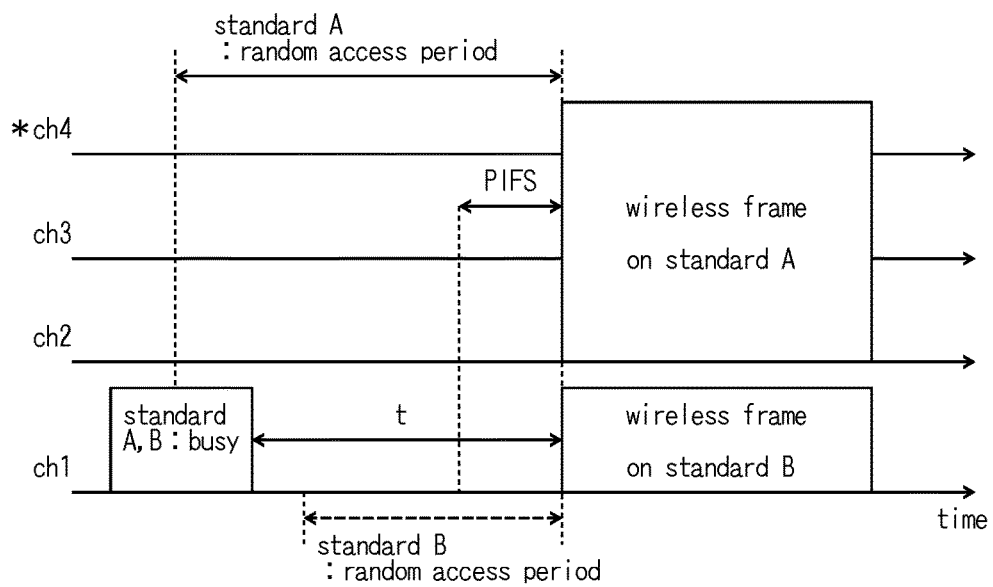
FIG. 20 is a diagram for describing a seventh example of the simultaneous transmissions processing in the random access processes based on the wireless communication standards A and B.

Seventh Example of the Simultaneous Transmissions Processing in the Random Access Processes Based on the Wireless Communication Standards A and B FIG. 20 is a seventh example of the simultaneous transmissions processing in the random access processes based on the wireless communication standards A and B.

In FIG. 20, the channels ch2 to ch4 are idle during the random access period for the wireless communication standard A. The channel ch1 is busy when the carrier sensing starts, but is idle from the scheduled transmission start time to before the PIFS time. Furthermore, the channel ch1 becomes idle from busy at the carrier sensing level for the wireless communication standard B, but time t prior to the scheduled transmission start time is longer than the random access period for the wireless communication standard B. Therefore, the wireless station 100 starts the simultaneous transmissions that use FDMA, over the channels ch2 to ch4 in the wireless LAN system that complies with the wireless communication standard A, and over therefore, the channel ch1 based on the wireless communication standard B.

Figure 21:
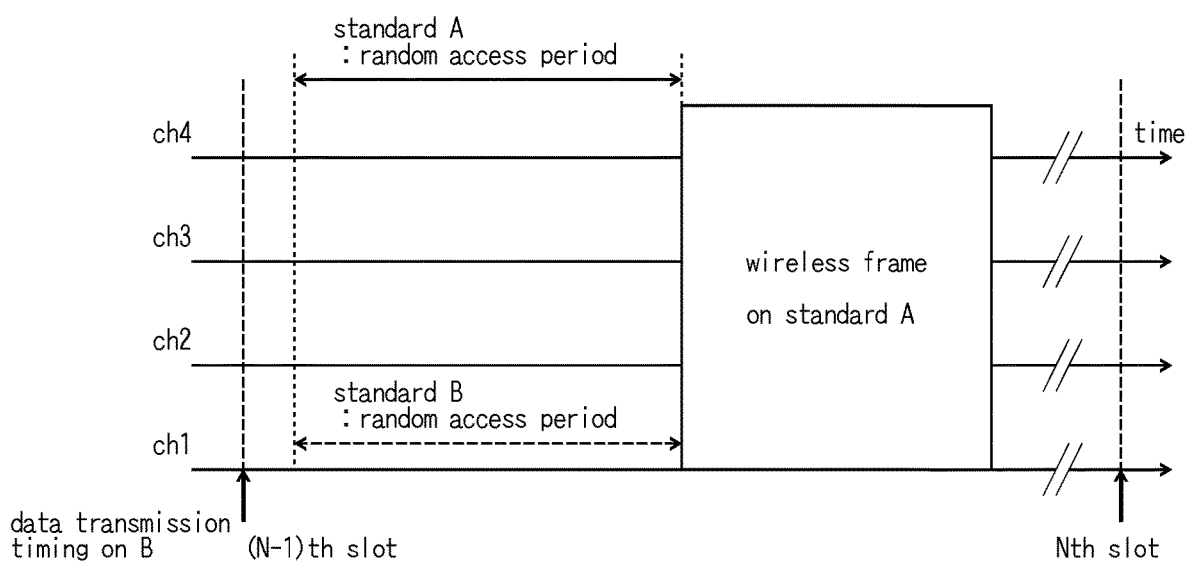
FIG. 21 is a diagram for describing an eighth example of the simultaneous transmissions processing in the random access processes based on the wireless communication standards A and B.
Figure 22:
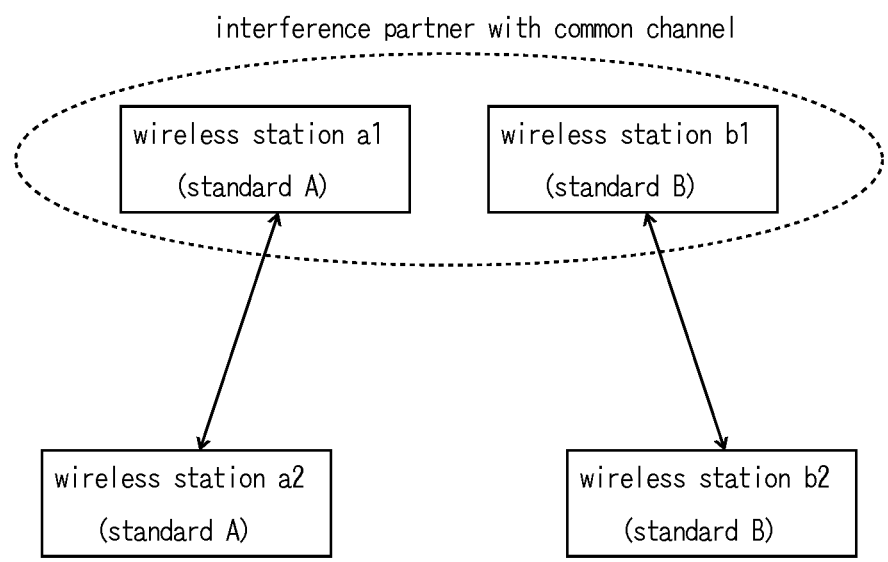
FIG. 22 is a diagram illustrating a relationship between two wireless communication standards between which contention for the same frequency band takes place.
Figure 23:
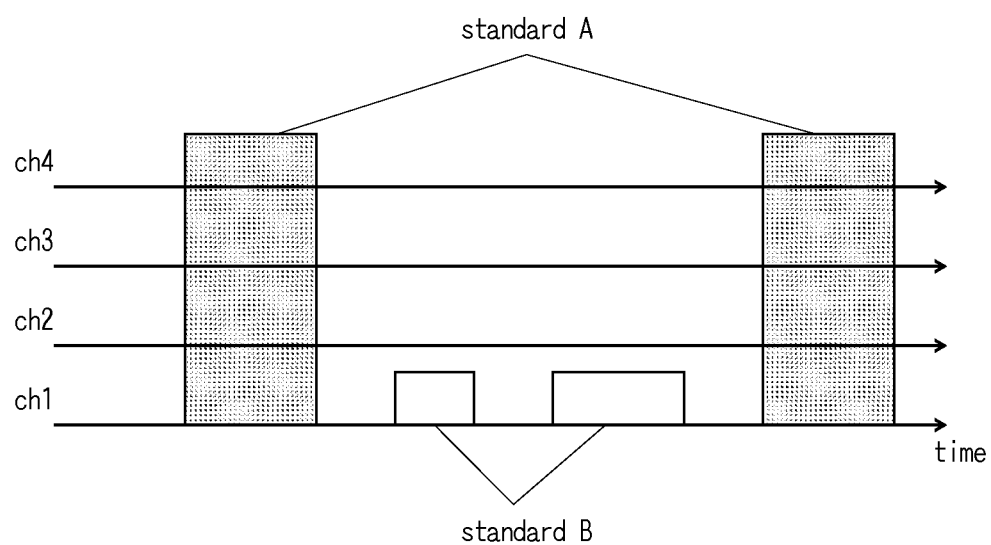
FIG. 23 is a diagram illustrating an example of a sequence in wireless communication environment with interference.
Figure 24:
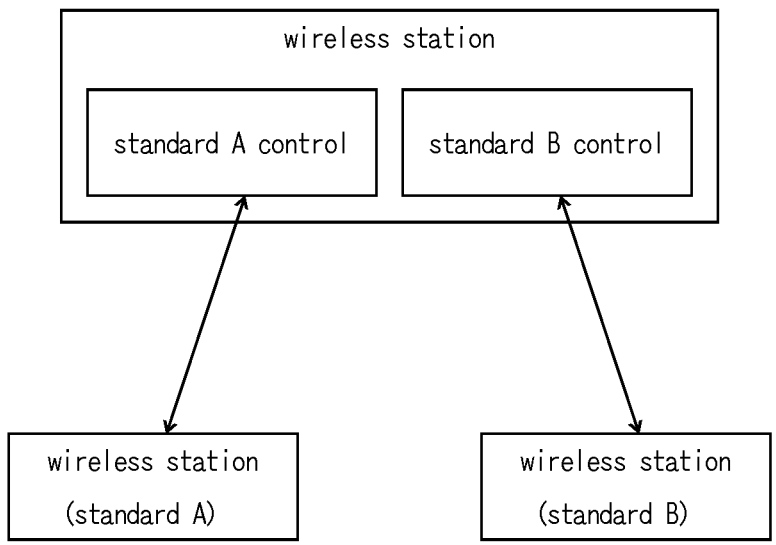
FIG. 24 is a diagram illustrating a configurational example of the wireless terminals/stations that correspond to the wireless communication standards A and B, respectively.
Figure 25:
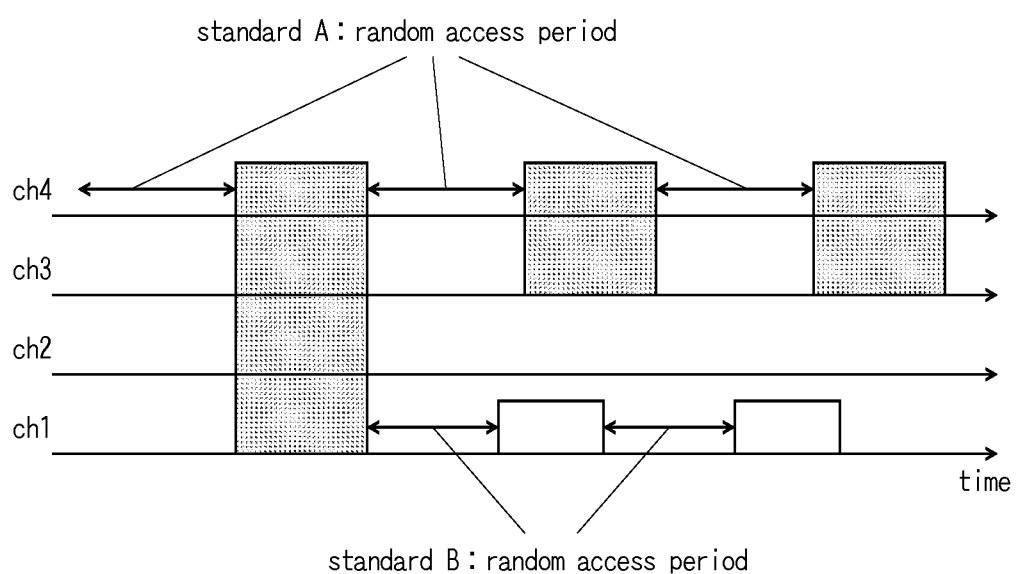
FIG. 25 is a diagram illustrating an example of channel switching based on the wireless communication standard A.

Eighth Example of the Simultaneous Transmissions Processing in the Random Access Processes Based on the Wireless Communication Standards A and B FIG. 21 is an eighth example of the simultaneous transmissions processing in the random access processes based on the wireless communication standards A and B.

At this point, as an example, a case where the wireless communication standard B is for the LAA system and where a timing at which the data transmission can be started is determined by a timing for the licensed band at which the control frame or the like is exchanged is described. In this case, although the LAA system can perform the random access until the transmission start timing is reached and can obtain the transmission opportunity, only a reservation signal, which does not carry data until the transmission start timing is reached, is transmitted. For this reason, the spectrum efficiency is also decreased by as much as a reservation signal length. Particularly, when the frame time length in the wireless communication standard A is completed until the transmission start timing for the wireless communication standard B after an access opportunity is obtained is reached, the transmission over all channels based on only the wireless communication standard A is performed without performing the simultaneous transmissions as described here. With the present process, a frequency occupancy time can be shortened, and the spectrum efficiency can be prevented from being decreased due to the reservation signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system in which a wireless station including a plurality of standard controls corresponding respectively to a plurality of wireless communication standards sharing a frequency resource, such that the wireless station performs a random access process corresponding to each of the wireless communication standards, obtains a transmission opportunity from the frequency resource used by each wireless communication standard, and transmits a wireless frame, wherein:
the wireless station includes a simultaneous transmissions management part
for each of the plurality of standard controls, setting a parameter for the random access process corresponding to each of the plurality of wireless communication standards, such that random access periods across the plurality of wireless communication standards are synchronized in time with each other,
controlling frequencies and transmission start timings based on the plurality of wireless communication standards, and
simultaneously transmitting wireless frames of each of the wireless communication standards using Frequency Division Multiple Access (FDMA), where the transmission opportunities are obtained by performing the random access process corresponding to each of the plurality of wireless communication standards under the control of the simultaneous transmissions management part.

2. A wireless station which performs a random access process, obtains a transmission opportunity with a frequency resource used for each wireless communication standard, and transmits a wireless frame, with a plurality of standard controls corresponding respectively to a plurality of wireless communication standards sharing a frequency resource, the wireless station comprising
a simultaneous transmissions management part
for each of the plurality of standard controls, setting a parameter for the random access process corresponding to each of the plurality of wireless communication standards, such that random access periods across the plurality of wireless communication standards are synchronized in time with each other,
controlling frequencies and transmission start timings of the plurality of wireless communication standards, and
simultaneously transmitting wireless frames of each of the wireless communication standards using FDMA, where the transmission opportunities are obtained by performing the random access process corresponding to each of the plurality of wireless communication standards under the control of the simultaneous transmissions management part.

3. The wireless station according to claim 2, wherein:
the simultaneous transmissions management part is configured to set a parameter for a common random access process of the plurality of wireless communication standards, for each of the plurality of standard controls; and
the plurality of standard controls are configured to perform the common random access process, and to simultaneously transmit the wireless frames of the wireless communication standards which obtained the transmission opportunities, using FDMA.

4. The wireless station according to claim 2, wherein:
the simultaneous transmissions management part is configured to set a parameter for the random access process of each of the wireless communication standards, for each of the plurality of standard controls; and
the plurality of standard controls are configured to perform each of the random access processes, and to simultaneously transmit, using FDMA, the wireless frames of the wireless communication standards which satisfy a condition for obtaining the transmission opportunities.

5. The wireless station according to claim 4, wherein
the simultaneous transmissions management part is configured to control a random access period corresponding to each of the wireless communication standards to be consistent with the longest random access period or a prescribed random access period, according to the wireless communication standard.

6. The wireless station according to claim 2, wherein:
the simultaneous transmissions management part is configured to set a parameter for either of the random access processes of the plurality of wireless communication standards, for each of the plurality of standard controls and;
the plurality of standard controls are configured to perform the either of the random access processes, and to simultaneously transmit the wireless frames of the wireless communication standards which obtained the transmission opportunities, using FDMA.

7. The wireless station according to claim 2, wherein
the plurality of standard controls are configured to perform the random access processes corresponding to the plurality of wireless communication standards, and if there is one wireless communication standard which obtained the transmission opportunity, using only the one wireless communication standard to transmit a wireless frame.

8. The wireless station according to claim 2, wherein
the plurality of standard controls are configured to perform simultaneous transmissions using the FDMA after performing a control sequence of a prescribed wireless communication standard; and
the control sequence notifies information on a NAV (Network Allocation Vector) period for an other wireless station and on the frequency resource used for the simultaneous transmissions.

9. The wireless station according to claim 8, wherein
after performing the control sequence of the prescribed wireless communication standard, a standard control of a wireless communication standard other than the prescribed wireless communication standard is configured to
perform a random access process corresponding to the wireless communication standard other than the prescribed wireless communication standard,
obtain the transmission opportunities, and
perform the simultaneous transmissions together with a wireless frame of the prescribed wireless communication standard using FDMA.

10. A wireless communication method which performs a random access process, obtains a transmission opportunity with a frequency resource used for each wireless communication standard, and transmits a wireless frame, with a plurality of standard controls corresponding respectively to a plurality of wireless communication standards sharing a frequency resource, the wireless communication method comprising a step in which a simultaneous transmissions management part sets a parameter for the random access process corresponding to each of the plurality of wireless communication standards, for each of the plurality of standard controls, such that random access periods across the plurality of wireless communication standards are synchronized in time with each other, controls frequencies and transmission start timings based on the plurality of wireless communication standards, and simultaneously transmits, using FDMA, wireless frames of each of the wireless communication standards, where the transmission opportunities are obtained by performing the random access process corresponding to each of the wireless communication standards under the control of the simultaneous transmissions management part.

* * * * *